(12) United States Patent
Lawder

(10) Patent No.: US 7,167,856 B2
(45) Date of Patent: Jan. 23, 2007

(54) METHOD OF STORING AND RETRIEVING MULTI-DIMENSIONAL DATA USING THE HILBERT CURVE

(76) Inventor: Jonathan Keir Lawder, 9 Truro Road, Walthamstow, London (GB) E17 7BY (*) Notice: Subject to any disclaimer, the term of this patent is extended or adjusted under 35 U.S.C. 154(b) by 457 days.

(21) Appl. No.: 10/139,544

(22) Filed: May 7, 2002

(65) Prior Publication Data
US 2003/0004938 A1    Jan. 2, 2003

Related U.S. Application Data

(60) Provisional application No. 60/290,779, filed on May 15, 2001.

(51) Int. Cl.
G06F 7/00 (2006.01)
G06F 17/30 (2006.01)

(52) U.S. Cl. ............................................. 707/3; 707/1

(58) Field of Classification Search ......... 707/1–104.1; 345/848, 700, 764, 411, 441, 418–419
See application file for complete search history.

(56) References Cited

U.S. PATENT DOCUMENTS

| | | | | |
|---|---|---|---|---|
| 5,761,916 A * | 6/1998 | Oswalt et al. | ................ | 62/127 |
| 5,781,906 A * | 7/1998 | Aggarwal et al. | .......... | 707/102 |
| 5,963,956 A * | 10/1999 | Smartt | ..................... | 707/104.1 |
| 6,003,036 A * | 12/1999 | Martin | ....................... | 707/102 |
| 6,021,406 A * | 2/2000 | Kuznetsov | ..................... | 707/6 |
| 6,084,595 A * | 7/2000 | Bach et al. | ................. | 345/589 |
| 6,148,295 A * | 11/2000 | Megiddo et al. | ................ | 707/3 |
| 6,154,746 A * | 11/2000 | Berchtold et al. | .......... | 707/100 |
| 6,311,181 B1* | 10/2001 | Lee et al. | ...................... | 707/5 |
| 6,381,605 B1* | 4/2002 | Kothuri et al. | ............. | 707/100 |
| 6,460,026 B1* | 10/2002 | Pasumansky | .................. | 707/1 |
| 6,470,287 B1* | 10/2002 | Smartt | ........................ | 702/102 |
| 6,622,141 B1* | 9/2003 | Lee et al. | ...................... | 707/5 |

OTHER PUBLICATIONS

J K Lawder and P J H King, "Using Space-filling Curves for Multi-dimensional Indexing", School of Computer Science and Information Systems, Mar. 2001, 16 pages.*
J K Lawder and P J H King, "Querying Multi-dimensional Data Indexed Using the Hilbert Space-Filling Curve", Birkbeck College, University of London, Mar. 2001, 5 pages.*

(Continued)

*Primary Examiner*—Don Wong
*Assistant Examiner*—Linh Black

(57) ABSTRACT

A method of partitioning and indexing multi-dimensional data that maps data to one-dimensional values according to the sequence in which an approximation of a Hilbert space-filling curve passes through all of the points corresponding to potential multi-dimensional data in a data space. Data is partitioned into ordered pages, each corresponding to a length of Hilbert curve and identified by the sequence of the first point on it. Practical application of the indexing method is made viable and useful by the provision of an efficient querying algorithm enabling data lying within any given hyper-rectangular query region to be retrieved. This is achieved by successively calculating ever higher sequence numbers of potential data points lying within a query region and each being the lowest such value for a point lying on a different curve section. Thus a single calculation is performed to identify each page potentially containing data of interest.

4 Claims, 18 Drawing Sheets

OTHER PUBLICATIONS

H. Tropf, H. Herzog, "Multidimensional Range Search in Dynamically Balanced Trees", Angewandte Informatik, Feb. 1981, pp. 71-77.*

Tetsuo et al., "Space Filing Curves and Their Use in the Design of Geometric Data Structures", Dept. of Applied Electronics, Osaka Electro-Communication University, Japan, vol. 181, Jul. 1997, 13 pages.*

J. Alber and R. Neidermeier. On Multi-Dimensional Hilbert Indexings. Proc. of Computing and Combinatorics. vol. 1449 Lecture Notes in Computer Science. pp. 329-338, Springer Verlag 1998.

T. Asano et al. Space Filling Curves and Their Use in the Design of Geometric Data Structures. vol. 911 Lecture Note in Computer Science. pp. 36-48, Springer Verlag 1995.

C. Faloutsos. Gray Codes for Partial Match and Range Queries IEEE Transactions on Software Engineering. vol. 14(10) pp. 1381-1393, Oct. 1988.

C. Faloutsos and S. Roseman. Fractals for Secondary Key Retrieval. Proc. 8th Symposium on Principles of Database Systems. Mar. 1989 pp. 247-252 ACM Press.

C. Faloutsos and Yirong. Dot; A Spatial Access Method Using Fractals. Proc. 7th Int. Conf. on Data Engineering. Apr. 1991 pp. 152-159 IEEE Computer Society.

I. Kamel and C. Faloutsos. Hilbert R-Tree: An Improved R-Tree Using Fractals. Proc. Int. Conf VLOB 1994 pp. 500-509, Morgan Kaufmann.

H. Tropf and H. Herzog. Multi-Dimensional Range Search in Dynamically Balanced Trees. Angewandte Informatik vol. 23(2) pp. 71-77 1981.

J. Lawder and P. King. Using Space-Filling Curves for Multi-Dimensional Indexing. Proc. of British National Conf. on Databases vol. 1832 Lecture Notes in Computer Science p. 20-35, Jul. 2000 Springer Verlag.

J. Lawder and P. King. Querying Multi-Dimensional Data Indexed Using the Hilbert Space-Filling Curve. ACM Sigmod Record vol. 30(1) pp. 19-24 Mar. 2001.

J. K. Lawder. The Application of Space-Filling Curves to the Storage and Retrieval of Multi-Dimensional Data. PhD Thesis, University of London, Aug. 2000, pp. 1-330.

* cited by examiner

| Symbol | Description |
|---|---|
| ∨ | bitwise inclusive OR operator |
| ⊕ | bitwise exclusive OR operator |
| ∧ | bitwise AND operator |
| ¬ | bitwise NOT operator |
| ≪ | bitwise left-shift operator |
| ≫ | bitwise right-shift operator |
| % | modulus operator |
| ⇐ | assignment operator |
| = | equality operator |
| ≠ | not equal to |
| < | less than |
| > | greater than |
| ≤ | less than or equal to |
| ≥ | greater than or equal to |
| ∩ | set intersection |

FIG. 1

| Butz' Term | Program Variable |
|---|---|
| $J_i$ | J |
| $(J_1 - 1) + \cdots + (J_{i-1} - 1)$ | xJ |
| $\rho^i$ | P |
| $\sigma^i$ | S |
| $\tilde{\sigma}^i$ | tS |
| $\tau^i$ | T |
| $\tilde{\tau}^i$ | tT |
| $\omega^i$ | W |
| $\alpha^i$ | A |

FIG. 2

Key to symbols

- - - - -  Page boundary

• Potential Datum-point

⊙ Datum-point

⬡ Point whose derived-key is a Page-key

Algorithm 1 Finding a Range Query *next-match* using a State Diagram

1: *current-search-space* ⇐ the whole space
2: *current-query-region* ⇐ the whole specified query region
3: *next-match* ⇐ 0
4: *current-state* ⇐ state 0
5: *page-key* ⇐ the *current-page-key* of the query process
6: *current-tree-level* ⇐ the root of the tree, ie level 1
7: while the *current-tree-level* is higher than or equal to the leaf level do
8:    find in which quadrants of the *current-search-space* the lower and upper bounds of the *current-query-region* lie
9:    $H$ ⇐ $n$ bits taken from the *page-key* corresponding to the *current-tree-level*
   {this is effectively the *derived-key* of the quadrant of the *current-search-space* in which the *page-key-point* lies}
10:   perform a binary search, given in Algorithm 3 (FIG.10C), of the *derived-keys* of the quadrants within the *current-search-space* to find, if it exists, the *current-quadrant*, which intersects with the *current-query-region* and whose *derived-key* is a minimum (which must be $\geq H$)
   {Note that if back-tracking takes place during the binary search, the values of *current-query-region*, *next-match*, *current-state* and *current-tree-level* are restored to values held in previous iterations of the loop in this algorithm.}
11:   if the binary search failed to identify a *current-quadrant* then
12:     return FALSE {the query execution is now complete}
13:   end if
14:   if *current-tree-level* $\neq$ the leaf level then
15:     *current-query-region* ⇐ *current-query-region* ∩ *current-quadrant*
16:     *current-search-space* ⇐ *current-quadrant*
17:   end if
18:   if $H$ = the *derived-key* of the *current-quadrant* and *current-query-region* = *current-quadrant* then
19:     *next-match* ⇐ *page-key*
20:     return TRUE
    {The *page-key* lies within the originally specified query and is its own *next-match*. The *next-match* has therefore been identified}
21:   end if
22:   *next-match* ⇐ *next-match* + ((the *derived-key* of the *current-quadrant*) $\ll$ ($n$(tree-height − *current-tree-level*)))
   {append the *derived-key* of the *current-quadrant* to the *next-match*}
23:   *current-state* ⇐ the *next-state* corresponding to the *derived-key* of the *current-quadrant* in the state diagram for the *current-state*
24:   *current-tree-level* ⇐ *current-tree-level* +1
25:   if $H$ < the *derived-key* of the *current-quadrant* then
26:     break out of the loop and go to the second loop, given in Algorithm 2 (FIG.10B)
27:   else
28:     continue with the next iteration of the current loop
29:   end if
30: end while
31: execute second loop, given in Algorithm 2 (FIG.10B)

FIG. 10A

Algorithm 2 Second Loop Referred to in Algorithm 1 (FIG.10A)
───────────────────────────────────────────────────────────────

{On entry to this loop, the *current-query-region* has been restricted to a quadrant in which the *derived-keys* of all of the points contained within it are greater than the *page-key* and so a *next-match* exists. All that remains to be done is to identify the lowest of these *derived-keys*. The bit values within the *next-match* which correspond to higher levels in the tree than the *current-tree-level* have already been placed in it during successive executions of the statement on line 22 above, Algorithm 1 (FIG.10A)}

1: while the *current-tree-level* is higher than or equal to the leaf level do
2:   if the *current-query-region* = *current-quadrant* then
3:     all bit values within the *next-match* which correspond to the *current-tree-level* and all lower levels $\Leftarrow 0$
4:     return TRUE
    {The *next-match* has been identified}
5:   end if
6:   find in which quadrants of the *current-search-space* the lower and upper bounds of the *current-query-region* lie
7:   perform a binary search of the *derived-keys* of the quadrants within the *current-search-space* to determine the *current-quadrant* which intersects with the *current-query-region* and whose *derived-key* is a minimum.
    {this operation is simpler than the binary search performed in Algorithm 3 (FIG.10C) since we need not have any regard to the value of the *page-key* nor concern ourselves with identifying sub-spaces to back up}
8:   if *current-tree-level* $\neq$ the leaf level then
9:     *current-query-region* $\Leftarrow$ *current-query-region* $\cap$ *current-quadrant*
10:     *current-search-space* $\Leftarrow$ *current-quadrant*
11:   end if
12:   *next-match* $\Leftarrow$ *next-match* + ((the *derived-key* of the *current-quadrant*) $\ll$ ($n$(tree-height − *current-tree-level*)))
    {append the *derived-key* of the *current-quadrant* to the *next-match*}
13:   *current-state* $\Leftarrow$ the *next-state* corresponding to the *derived-key* of the *current-quadrant* in the state diagram for the *current-state*
14:   *current-tree-level* $\Leftarrow$ *current-tree-level* +1
15: end while
16: return TRUE

FIG. 10B

Algorithm 3 Binary Search of the *current-search-space* using State Diagrams 1: carry out each iteration of the binary search on the quadrants within the *current-search-space* as follows:
2: if the *current-query-region* intersects with quadrants in the lower half (ie quadrants whose *derived-keys* are lower than those of the upper half) and the maximum *derived-key* of any quadrant in the lower half is equal to or greater than $H$ (ie the *page-key-point* lies in one of the quadrants of the lower half) then
3:   if the *current-query-region* also intersects with quadrants in the upper half then
4:     make a 'back-up', ie a record, of the current values of variables which may be restored later if backtracking is required: these are *current-query-region*, *next-match*, *current-state*, *current-tree-level* and the *derived-keys* of the quadrants which define the bounds of the upper half of the quadrants of interest in the current iteration of the binary search
    {Any back-up made in this manner replaces the previously made back-up, if it exists, whether it was made during the current iteration of the loop in Algorithm 1 (FIG.10A) or an earlier one. The search space will also be smaller than any previously stored}
5:   end if
6:   continue the binary search in the lower half
7: else
8:   if the *current-query-region* intersects with the upper half then
9:     continue the binary search in the upper half
    {Note that $H$ may or may not correspond to a quadrant in the upper half but this is of no concern at this point}
10:   else
11:     if no back-up exists then
12:       return FALSE
      {no *next-match* exists and the query process terminates}
13:     else
14:       restore the values of working variables to those recorded in the back-up
15:       continue the binary search in the restored search space
16:     end if
17:   end if
18: end if

FIG. 10C

Key to symbols

- - - - - Page boundary

• Potential Datum-point

⊙ Datum-point

◯ Point whose derived-key is a Page-key

A..Q Labels for points, refered to in the commentary

Query region:
Lower bound: point F
Upper bound: point P

✕ Point whose derived-key is a next-match to the query

First iteration of binary search

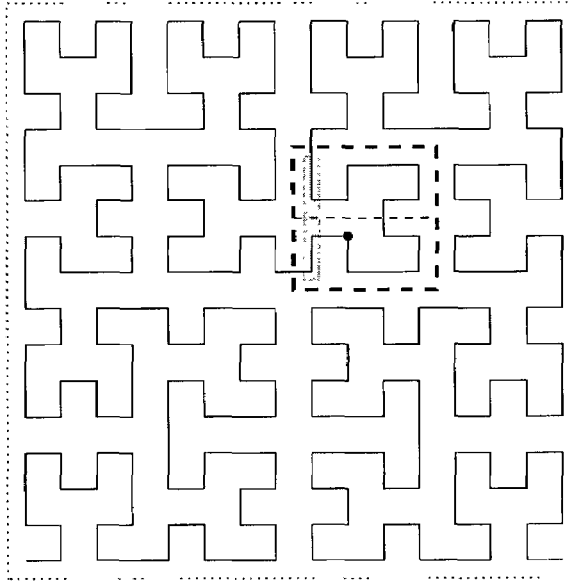

* Tree Level = 3
* Current-Search-Space State = 1
* Quadrant Order in Current-Search-Space (from State Diagram)

| 11 | 10 |
|----|----|
| 00 | 01 |

* Page-key = 1 0 0 0 0 0 1 0 - lies in quadrant 0 0
* next-match = 1 0 0 0 ? ? ? ?

Lower 2 quadrants (00 and 01) intersect with Query region and also contain the Page-key Therefore, continue search in lower 2 quadrants NB upper 2 quadrants (10 and 11) also intersect with Query region - searching may back-track here later

Second iteration of binary search

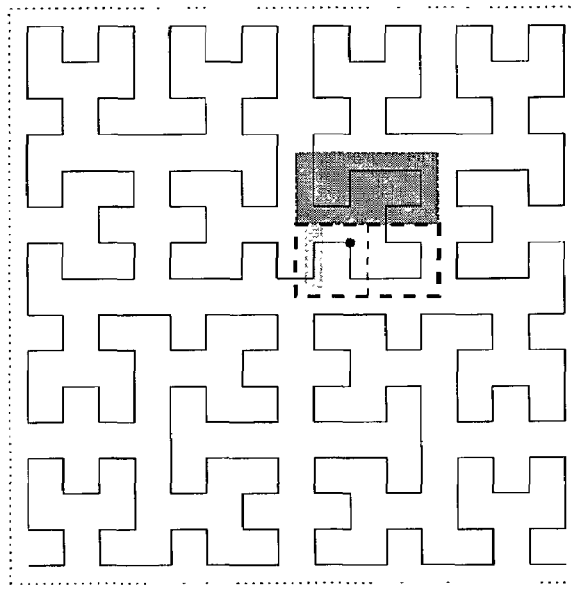

Restrict Current-Search-Space to lower 2 quadrants (dark shaded area is dicarded)

Lower quadrant (00) in Current-Search-Space intersects with Query region and also contains the Page-key Therefore, bits of next-match corresponding to Tree Level '3' = 0 0

Therefore, next-match = 1 0 0 0 0 0 ? ?

In the next step, restrict Current-Search-Space to quadrant 00, restrict Query region to that part which intersects with quadrant 00 and set new Current-Search-Space state to the 'next-state' for quadrant 00 (from the state diargram: ie set it to 0)

*FIG. 12C*

First iteration of binary search

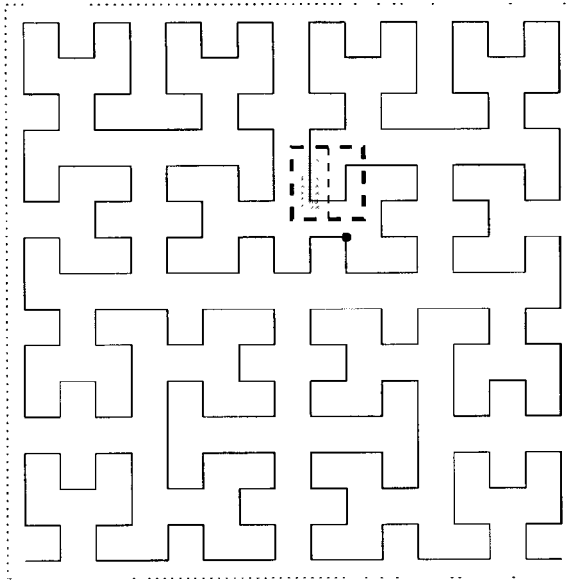

* Tree Level = 4
* Current-Search-Space State = 3
* Quadrant Order in Current-Search-Space (from State Diagram)

| 11 | 00 |
|----|----|
| 10 | 01 |

* Page-key: not relevant
* next-match = 1 0 0 0 1 1 ? ?

Lower 2 quadrants (00 and 01) do not intersect with the Query region but the upper 2 quadrants (10 and 11) do intersect with it Therefore, continue search in upper 2 quadrants

Second iteration of binary search

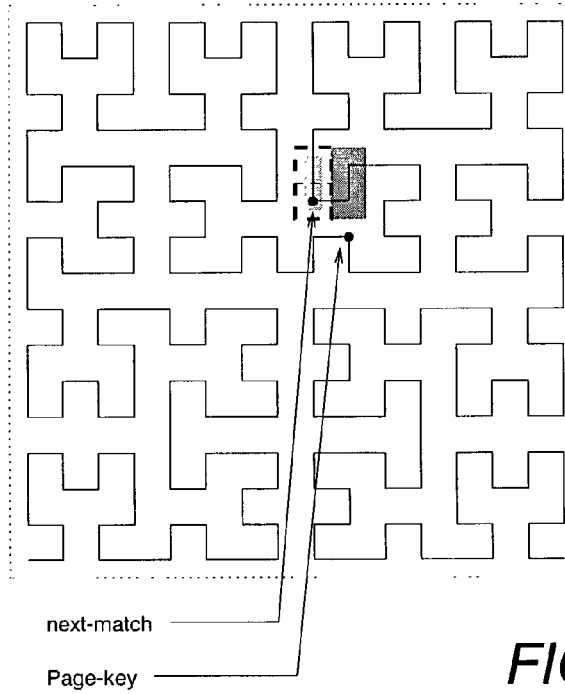

next-match
Page-key

Restrict Current-Search-Space to upper 2 quadrants (dark shaded area is dicarded)

Lower quadrant (10) in Current-Search-Space intersects with Query region

Therefore, bits of next-match corresponding to Tree Level '4' = 1 0

Therefore, next-match = 1 0 0 0 1 1 1 0

Since Tree Level 3 is the leaf level, the next-match is the derived-key of a point The search is now complete

FIG. 12F

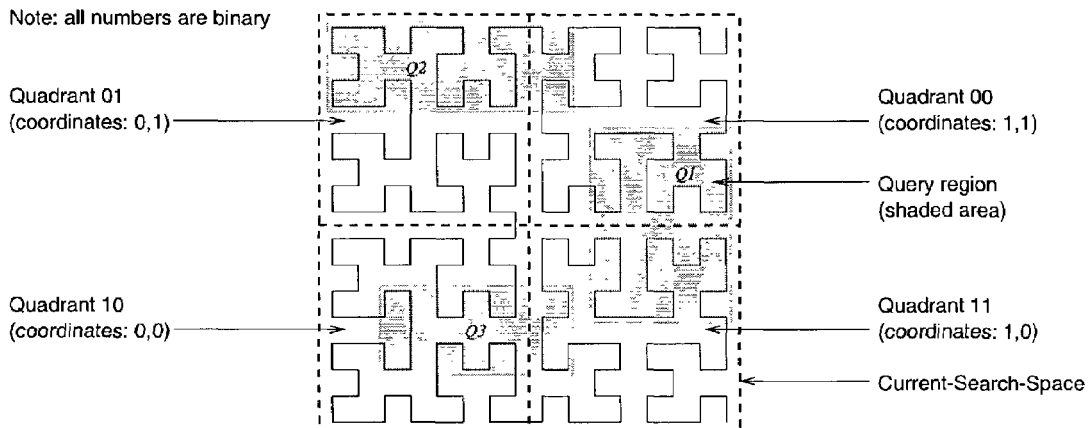

| Quadrant coordinates of example Query regions | | |
|---|---|---|
| Query | Lower bound | Upper bound |
| Q1 | 1, 0 | 1, 1 |
| Q2 | 0, 1 | 1, 1 |
| Q3 | 0, 0 | 1, 0 |

Quadrants within the Current-Search-Space

Derived-key: | 00 | 01 | | 10 | 11 |  ← upper half of Current-Search-Space

Coordinates: | 11 | 01 | | 00 | 10 | a — | 01 ⊖ 00 | = 01 ← j

'j' contains one non-zero bit only, regardless of the number of dimensions in a space. It indicates that quadrants in lower half of Current-Search-Space all differ from quadrants in upper half in the Y-dimension, in this example.

The operation: a ∧ j = 01 therefore indicates that quadrants in the lower half of the Current-Search-Space have coordinate values in the Y-dimension of 1 (thus quadrants in upper half have coordinate values in the Y-dimension of 0)

Q1: upper bound coordinates in Y-dimension = 1, therefore Query region intersects with quadrants in the lower half of the Curreent-Search-Space Q2: lower AND upper bound coordinates in Y-dimension = 1, therefore Query region intersects with quadrants in the lower half of the Current-Search-Space Q3: lower AND upper bound coordinates in Y-dimension = 0, therefore Query region does not intersect with quadrants in the lower half of the Current-Search-Space

*FIG. 13*

METHOD OF STORING AND RETRIEVING MULTI-DIMENSIONAL DATA USING THE HILBERT CURVE

This application is entitled to the benefit of Provisional Patent Application Ser. No. 60/290,779 filed 15 May 2001.

CROSS-REFERENCE TO RELATED APPLICATIONS

Not applicable

STATEMENT REGARDING FEDERALLY SPONSORED RESEARCH AND DEVELOPMENT

Not applicable

BACKGROUND OF THE INVENTION

The present invention relates to an efficient method of partitioning and indexing multi-dimensional data together with a conceptually simple and computationally efficient method of selectively retrieving subsets of the data, where subsets are defined as the data lying within rectangular regions within multi-dimensional space.

A file or database of multi-dimensional data contains representations of logical entities, each of which is described by an ordered set of attributes, or 'dimensions' or coordinates. Moreover, these entities need to be organized and stored in some way so that sub-sets can be selectively and 'efficiently' retrieved according to values or ranges of values in one or more of any of their attributes.

The most commonly applied solution at present is the 'relational database' model, originating from the late 1960s, although this is not specifically a multi-dimensional method. The relational method usually orders data according to values in a set of one or more attributes whose values are placed in a 'primary index'. This facilitates easy access to subsets of data whose primary key values lie within a given range of values. In order to facilitate retrieval of a subset of data whose values in a non primary key subset of one or more attributes lie within a given range of values, secondary indexes are commonly used on one or more subsets of non primary key attributes. This gives rise to a number of problems.

Firstly, there is a practicable limit to the number of secondary indexes that can be supported. Potentially $2^n-2$ indexes can be provided for n-dimensional data but to provide all of these requires an excessive amount of storage capacity and an excessive maintenance overhead when data is updated. In practice only a limited amount of secondary indexes is only ever provided.

Secondly, if a desired secondary index does not exist, some queries require the costly operation of intersecting two or more indexes or intersecting the results of two or more subsidiary queries.

Thirdly, retrieval of data using any secondary index can never be as efficient as using a primary index, since the underlying data is not actually ordered by the secondary index, thus more pages of data in a database need to be retrieved and searched. In consequence, some forms of query are more efficiently executed than others.

The relational implementations may have hitherto adapted to changing requirements for handling data but this does not ensure that they will be able to provide universal solutions in the future. Data generation and collection continues to grow at an ever accelerating rate along with aspirations for more sophisticated analysis and processing techniques and capabilities. Data that is being generated and collected is also becoming increasingly high-dimensional in its nature.

A considerable volume of research has been carried out in the area of indexing multi-dimensional data over many years. Nevertheless, no paradigm appears to have emerged to compare with the pre-eminence of the B-Tree and its variants in the indexing of one-dimensional data. Indeed, the volume of previous and continuing research provokes the conclusion that the development of an optimum strategy for indexing multi-dimensional data very much remains a problem unsolved.

A design of a 'true' multi-dimensional database organization method attempts to solve the conflicting problems of how to store data compactly while enabling it to be selectively retrieved, or 'queried', flexibly and efficiently.

Most file organization methods partition data by dividing the space in which it is embedded into rectangles, or their equivalent in higher dimensions, and an index entry is created for each rectangle. When only a few rectangles are defined the index can be accommodated in memory and serially searched as updates and queries are performed. Once the number of such rectangles exceeds some threshold, they must be partitioned, initially, into 2 sub-sets, each of which is most commonly regarded as a node in a tree index structure. A problem arises, often immediately, in that rectangles enclosing a pair of sub-sets of smaller rectangles may overlap. Thus where data insertion is required, for example, it may be necessary to search more than one path in an index tree to locate the page on which to place the data. Avoiding or accommodating this has been the focus of much of the research into organizing multi-dimensional data.

The Grid File, described by Jürg Nievergelt, Hans Hinterberger and Kenneth C. Sevcik in "The grid file: An adaptable symmetric multikey file structure", ACM Transactions on Database Systems, 9(1):38–71, 1984, is characterized by an exponential directory growth rate, a need for periodic significant directory reorganization and the requirement for directory lists to be intersected in the execution of queries.

The R-Tree index, described by Antonin Guttman in "R-Trees: A dynamic index structure for spatial searching", SIGMOD'84: Proceedings of the Annual Meeting, volume 14(2) of Sigmod Record, pages 47–57, ACM, 1984, is balanced and simple in comparison with many other methods and not subject to the same degree of reorganization on insertion and deletion of data. However, these benefits are gained at the expense of tolerating overlapping rectangles which can significantly degrade query performance. The R-Tree was designed for indexing multi-dimensional spatial data rather than point data.

The BANG File, described by M. Freeston in "The BANG File: A new kind of grid file" in Proceedings of the Association for Computing Machinery Special Interest Group on Management of Data 1987 Annual Conference, San Francisco, May 27–29, 1987, pages 260–269, tolerates overlapping rectangles but in a more controlled manner than in the R-Tree. It requires a complex, although balanced, index structure. This design has been the subject of a number of papers although none addresses algorithms for executing queries. I do not believe that this is because they are dealt with trivially.

The SS-Tree, described by David A. White and Ramesh Jain in "Similarity indexing with the SS-Tree" in Proceedings of the Twelfth International Conference on Data Engineering, Feb. 26–Mar. 1, 1996, New Orleans, pages 516–523, IEEE Computer Society, 1996, is a 'similarity' indexing method oriented to the storage of multi-dimensional data in a manner which supports 'similarity queries'. Such queries may be of the forms, "find objects similar to a reference" and "find pairs of objects which are similar", in addition to conventional query forms. Data is transformed into 'feature vectors', which take account of the varying significances of values in different dimensions. A significant disadvantage, however is that the input of a domain expert is required for this purpose. Space containing feature vectors is then partitioned into spheres which theoretically contain the k-nearest neighbours of their centre points. I say 'theoretically' since, in practice, there is a problem in that spheres may overlap in the way that the rectangles of the R-Tree do.

The SR-Tree, described by Norio Katayama and Shin'ichi Satoh in "The SR-Tree: An Index Structure for High-Dimensional Nearest Neighbor Queries" in SIGMOD 1997, Proceedings ACM SIGMOD International Conference on Management of Data, May 13–15, 1997, Tucson, Ariz., USA, ACM Press, 1997, pages 369–380, is similar to the SS-Tree, with its attendant problems, except that feature space is partitioned into regions defined by the intersection of spheres and rectangles (where spheres are not wholly contained within the rectangles). The benefit of this approach is that partitions overlap to a lesser extent than in the SS-Tree.

The X-Tree, described by Stefan Berchtold, Daniel A. Keim and Hans-Peter Kriegel in "The X-Tree An Index Structure for High-Dimensional Data", VLDB'96, Proceedings of 22th International Conference on Very Large Data Bases, Sep. 3–6, 1996, Mumbai (Bombay), India, 1996, pages 28–39, addresses the problem of overlapping regions manifest in the R-Tree. This is achieved at the cost of allowing nodes in a tree to be of variable rather than fixed size.

If the rectangles in an overfull node cannot be partitioned into 2 roughly equal sized sub-sets whose minimum bounding boxes overlap within the limits defined in some threshold then an 'overlap-free' split is sought. This entails consulting a data structure which records the history of previous splits. At least one overlap-free split can always be found for a node but if it results in one of the new nodes being populated with fewer rectangles than defined in some threshold, then the original node is not split but allowed to become enlarged instead. The X-Tree is thus a hybrid between a linear array index and an R-Tree index.

Whereas spatial objects may overlap, this is clearly not the case with point data. It is debatable whether data organization methods which permit overlapping regions in the partitioning of point data do so because they are specializations of methods primarily designed for spatial data or because there is some inherent advantage in tolerating overlap.

The Pyramid-Technique, described by Stefan Berchtold, Christian Böhm and Hans-Peter Kriegel in "The Pyramid-Tree: Breaking the Curse of Dimensionality", SIGMOD 1998, Proceedings ACM SIGMOD International Conference on Management of Data, Jun. 2–4, 1998, Seattle, Wash., USA, ACM Press, 1998, pages 142–153, partitions the data space in a 2-stage process. In the first stage, it is divided into pyramids all of whose apexes lie at the centre of the space. In the second stage, each pyramid is divided into slices, the bases of which are all hyper-planes parallel to the base of the pyramid. Each slice of a pyramid corresponds to a page of the data file.

Multi-dimensional points are transformed into one-dimensional values by a mapping which is not bijective, thus more than one point may map to the same value, which necessitates an overhead of the storage of both the coordinates of points and their one-dimensional values. A one-dimensional value designates which pyramid a point lies in and its height above its base. The paper describes a query processing algorithm which the authors acknowledge is a "complex operation".

The technique can be adapted to skewed data distributions by moving the apex of all of the pyramids into the centre of a data cluster, creating asymmetrical pyramids. In practice data sets may contain more than one cluster and the locations of clusters may be dynamic. A dynamic pyramid apex location does not, however, appear to be practicable.

The manner in which pyramids are divided into slices appears to suggest that partitioning may degrade locally such that all points on a page share similar values in one dimension but potentially very diverse values in all others.

The use of the Hilbert Curve, named after David Hilbert, the German mathematician, in the indexing of multi-dimensional data has been suggested by Christos Faloutsos and Yi Rong in "DOT: A Spatial Access Method Using Fractals", Proceedings of the Seventh International Conference on Data Engineering, Apr. 8–12, 1991, Kobe, Japan, IEEE Computer Society, 1991, pages 152–159, but no application other than that of the present inventor has been developed and, most importantly, no querying algorithm has hitherto been invented. Without a querying algorithm, enabling data to be selectively retrieved without searching the entire database, the application of the Hilbert Curve in the indexing of multi-dimensional data is of little value or viability.

BRIEF SUMMARY OF THE INVENTION

The present invention is a method of organising multi-dimensional data such that it can be easily partitioned into pages of data in a data store that can be easily indexed, together with a method of querying the data in the data store in a flexible and efficient manner. The present invention adapts well to varying numbers of dimensions, varying quantities of multi-dimensional data and to databases whose contents vary over time through insertion of new data and deletion of existing data. The present invention is based of the work contained in the PhD thesis of the inventor: "The application of space-filling curves to the storage and retrieval of multi-dimensional data" by J. K. Lawder that was awarded by the University of London on 31 Aug. 2000.

Multi-dimensional data objects are mapped to one-dimensional values using a Hilbert Curve which passes through the points in a particular sequence. Thus a one-dimensional value corresponding to a point is the sequence of the point along the curve. The mapping induces a linear ordering of points in multi-dimensional space and so also orders the data objects. The data objects are then partitioned into ordered subsets corresponding to pages of storage in a data store. Each page, or partition, corresponds to a length of the Hilbert Curve. All of the points on one length of Hilbert Curve (whether they correspond to actual data objects or not) map to lower one-dimensional values than all of the points on the next length of curve, corresponding to the next partition, thus the partitions are ordered.

The partitions are then indexed using a simple one-dimensional index method, such as the B-Tree, by placing a reference to each partition in the index together with the location of the partition within the data store. A reference to a partition may be the lowest sequence number of a point on the length of the Hilbert Curve to which the partition corresponds. Alternatively, it may be the highest sequence number. Alternatively the reference may be the lowest or highest sequence number of an actual data object stored within the partition. The reference may also be a pair of lowest and highest values of points delimiting a length of Hilbert Curve.

The execution of a query on the data store, that is to say, the retrieval of data objects that lie within a specified multi-dimensional rectangle, proceeds as follows: firstly, the lowest Hilbert Curve sequence number of any point within the query region is calculated and the page that may contain its corresponding data object, if it exists, is then retrieved and searched for data objects lying within the query region.

Secondly, the lowest sequence number of any point within the query region which is higher than the sequence number of any point on the section of Hilbert Curve corresponding to the page just searched is calculated, if it exists. The page that may contain this sequence number's corresponding data object, if it exists, is then retrieved and searched for data objects lying within the query region.

The previous step is then repeated until no further pages are found to exist that intersect with the query region.

Alternatively it is possible to identify all of the pages that inetersect a query region before any of them are retrieved from the data store and searched.

The present invention offers many advantages over the prior art and a combination of advantages not present in any particular method forming part of the prior art.

The combination of the indexing method, which relies on mapping multi-dimensional objects to one-dimensional values, and the querying algorithm has the effect of simulating the existence of each and every possible secondary index which can be created and used to gain selective access to multi-dimensional data. This is achieved without the storage overhead of actually providing separate secondary indexes. The index is therefore extremely compact in comparison with some alternative methods.

In simulating the provision of each and every secondary index, the present invention achieves a degree of flexibility which is not practicable where conventional secondary indexes are relied upon. This is particulary the case in higher dimensional data spaces since the total number of possible secondary indexes equals $2^n-2$.

The present invention enables the utilization of any simple and well understood one-dimensional indexing structure to be used for the organization and storage of multi-dimensional data.

The mapping method, in utilizing the Hilbert Curve, partitions data so that, in general, each partition contains data objects that are close to each other in multi-dimensional space. Thus data objects that are in proximity to each other are clustered in the data store. This aids minimizing the number of pages to be searched in the execution of a query.

The manner in which data is partitioned facilitates achievement of a high storage utilization. That is, the occupancy of pages of storage with actual data objects can be guaranteed to be relatively high and consistently so, in comparison with other methods described in the prior art.

The index remains compact and grows in proportion to the volume of data placed in the data store.

The index and page utilization adapts well on update of the data store through insertion and deletion of data objects.

In identifying pages of data to be searched and searching the pages one at a time, the querying algorithm facilitates the lazy retrieval of data rather than identifying all of the data pages that intersect with a query region before any page is searched, even if only some rather than all matches to a query are required.

The indexing design and the querying algorithm are scalable both in terms of the number of dimensions that exist in a data space and in terms of the volume of data that is stored. The complexity of the process is proportional to the number of dimensions in the data space and the volume of data.

The querying algorithm makes viable the application of the Hilbert Curve in the partitioning and indexing of multi-dimensional data.

The present invention can accommodate different partitioning strategies. For example, pages of data can correspond to contiguous sections of the Hilbert Curve, in which case a single value or derived-key can be used to identify a page. Alternatively, pages of data can correspond to lengths of Hilbert Curve that are not contiguous. Each such page is identified by a pair of values, one being the lowest derived-key of any datum-point stored on the page and the other being the highest derived-key of any datum-point stored on the page. In this second alternative, the index implies sections of Hilbert Curve on which no datum-points stored in the database lie. This arrangement can assist in minimising the number of pages of data that need to be searched in the execution of a query.

The present invention can be used with any type of multi-dimensional data by mapping individual attribute domains to integers.

The present invention can be implemented using any method of mapping to the Hilbert Curve. These mapping algorithms can describe any form of curve that conforms with the concepts of the Hilbert Curve, namely its symmetry and the principle that points that map to successive sequence values are adjacent in space.

The present invention can be implemented using any orientation of the Hilbert Curve. That is to say, the Hilbert Curve may begin in any corner of the data space and terminate at any adjacent corner of the data space.

The present invention can be implemented using any general purpose computer programming language.

The present invention can be implemented on any computer architecture.

The validity of the present invention and its correct functioning have been practically verified and demonstrated by the present inventor by implementing the concepts as a fully functioning computer program.

A need for a database organization and retrieval method designed specifically to address the problems inherent in large volumes of multi-dimensional data will continue to grow. The present inventor believes that a successful solution must be not just effective in all respects but also simple. The design and implementation of such a solution, that addresses the partitioning and indexing of data, the organization of storage and the execution of queries, is the subject of the present invention.

DRAWING FIGURES

The present invention will be described in detail in the following description of preferred embodiments with reference to the following figures, wherein:

FIG. 1: "Symbols used in the algorithms". Defines mathematical symbols used in Algorithms 1 to 3, shown in FIGS. 10A–10C.

FIG. 2: "Key to Variables". A cross-reference between mathematical symbols used in the paper written by Arthur R. Butz, referred in the Section titled 'Background of the invention', and variable names used in the source code included int the specification.

FIG. 3: "Partitioning of the Hilbert Curve into Pages". Shows how sections of the Hilbert Curve correspond to pages in a database and exemplifies usage of some terms used in this description.

FIG. 4: "Approximations of the Hilbert Curve in 2 Dimensions". Illustrates the first order Hilbert Curve in 2 dimensions.

FIG. 5: "Approximations of the Hilbert Curve in 2 Dimensions". Illustrates the second order Hilbert Curve in 2 dimensions.

FIG. 6: "Approximations of the Hilbert Curve in 2 Dimensions". Illustrates the third order Hilbert Curve in 2 dimensions.

FIG. 7: "The Tree Representation of the Third-order Hilbert Curve in 2 Dimensions". Shows how the Hilbert Curve can be expressed as a tree of nested sub-spaces.

FIG. 8: "A State Diagram for the Hilbert Curve in 2 Dimensions". An example state diagram used in the process of mapping between n-dimensional points and one-dimensional sequence numbers.

FIG. 9: "Flow Diagram for the Query Process". Illustrates the process by which a range query is executed.

FIG. 10A: "Algorithm 1: Finding a Range Query next-match using a State Diagram". Describes the first part of the algorithm for calculating the lowest sequence number of a point on the Hilbert curve that is equal to or greater than the sequence number of some other point.

FIG. 10B: "Algorithm 2: Second Loop Referred to in Algorithm 1 (FIG. 10A)". Describes the second part of the algorithm described in FIG. 10A and referred to in that Figure.

FIG. 10C: "Algorithm 3: Binary Search of the current-search-space using a State Diagram". Describes the detail of binary searches that take place within the descriptions given in FIG. 10A and FIG. 10B.

FIG. 11: "Example Query". Illustrates an example query on a 2-dimensional database.

FIG. 12A: "Finding the next-match to a Range Query: Step 1 (of 6)". An example in 2 dimensions showing how the calculate_next_match function, described in FIG. 10A–10C., operates. The example comprises 6 iterations of the algorithm. This figure shows the first iteration. Iterations 2–6 are shown in FIGS. 12–12F.

FIG. 12B: "Finding the next-match to a Range Query: Step 2 (of 6)". An example in 2 dimensions showing how the calculate_next_match function operates.

FIG. 12C: "Finding the next-match to a Range Query: Step 3 (of 6)". An example in 2 dimensions showing how the calculate_next_match function operates.

FIG. 12D: "Finding the next-match to a Range Query: Step 4 (of 6)". An example in 2 dimensions showing how the calculate_next_match function operates.

FIG. 12E: "Finding the next-match to a Range Query: Step 5 (of 6)". An example in 2 dimensions showing how the calculate_next_match function operates.

FIG. 12F: "Finding the next-match to a Range Query: Step 6 (of 6)". An example in 2 dimensions showing how the calculate_next_match function operates.

FIG. 13: "Examples: how to determine which sub-spaces intersect with a query region".

FIG. 14: "A Tree Representation of the Fourth Order Hilbert Curve in 2 Dimensions". For the calculate_next_match example illustrated in FIGS. 12A–12F, shows how the tree representation of the Hilbert Curve is traversed.

DETAILED DESCRIPTION OF THE INVENTION

1 Data Organization and Indexing

The present invention relates to data spaces, or database domains, containing finite numbers of points, or finite numbers of possible actual data values, in which the Hilbert Curve, which is an 'approximation' of the Hilbert Space-filling Curve, passes through all points once and once only. The present invention approaches the organization of multi-dimensional data by regarding the data as points lying on the Hilbert Curve. The Hilbert Curve is described in Section 2 of this description of the present invention and methods of calculating mappings are described in Section 3.

The Hilbert Curve is named after the German mathematician David Hilbert. Hilbert represented the coordinates of points in space with a binary radix and this method is also used in the description of the present invention.

Each point in any space of finite granularity of points lies a unique distance along the curve from its beginning and thus is placed in order along a one-dimensional line of distance, or sequence, values. Thus points in multi-dimensional space, or n-dimensional space, where n is the number of dimensions in a space, are mapped to or transformed into values in one dimension that may be stored in or indexed by any simple one-dimensional data structure.

In order to map multi-dimensional data to one-dimensional values, it is first necessary to map individual attribute values of the data to integers. The Hilbert Curve passes through points in spaces that are squares in 2 dimensions, cubes in 3 dimensions or hyper-cubes in spaces with more than 3 dimensions and so the domain, or range of possible values, of the integers is the same in all dimensions even if the domains of individual attributes are of different size. A maximum integer value is the number that in the binary representation comprises bits or digits of value 1. Thus the maximum value of an integer is defined as $2^k-1$, where k is chosen as appropriate for the size of the largest attribute domain of any possible item of multi-dimensional data to be stored in the database. The number of binary digits in an integer attribute value therefore equals k. In Section 2 of this description of the present invention this value of k corresponds to what is called the order of curve used in the mapping between multi-dimensional data and one-dimensional values. It is convenient and preferred, although not necessary, in a practical software implementation of the invention if the maximum integer value accommodated for an attribute value is the same as the maximum value accommodated by an unsigned integer data type supported by the computer programming language and its compiler used for the implementation. For example, an unsigned integer data type which comprises 32 binary digits accommodates multi-dimensional data whose largest attribute domain is within the range $[0 \ldots 2^{32}-1]$. It is also preferred, although not necessary, that the smallest possible data type that can accommodate the maximum attribute value is used in the software implementation, in order to optimize the performance of the implementation.

How non-integer attribute values are mapped to integers is independent of this invention and any suitable method may be chosen.

The Hilbert Curve has certain interesting properties whereby points that are close to each other in n-dimensional space are, in general, mapped to one-dimensional values that are also in proximity to each other. Points that are consecutive in their ordering, according to the mapping using the Hilbert Curve, are adjacent in space. Thus the mapping achieves a degree of clustering of data with similar values in all attributes or dimensions which is desirable in the absence of prior knowledge of the pattern of queries that will be executed over a collection of data.

The multi-dimensional data that make up a database are partitioned into sub-sets. Each sub-set corresponds to a logical unit of storage held on a computer. In this invention, each sub-set is defined as a collection of points lying on a single contiguous section or length of the Hilbert Curve. Actual multi-dimensional data values stored in the database are called here datum-points. Each logical unit of storage is commonly called a page of data. Thus the Hilbert Curve is conceptually cut into sections, each section corresponding to a page. Each section of curve is delimited by a pair of points, one lying at each end of the section. The length of each curve section depends on the local density of datum-points and the physical capacity for datum-points of the page to which it corresponds.

A database held in computer memory comprises a set of pages and the size of this set depends on the volume of data, or number of datum-points, contained in the database and the average number of datum-points stored on the pages divided by the capacity of the pages. The set of pages may be held in a single computer file or be distributed between more than one computer file. Pages of datum-points may be stored in volatile or persistent memory. Each page also corresponds to a volume of space within an n-dimensional hyper-cubic space that defines the domain of the database. The form of the data space that corresponds to any particular page may also be a hyper-cube but will usually be more complex. In the preferred embodiment of the invention, the datum-point capacity of each page is the same for all pages. Alternatively, pages may be of variable size, with different pages having different capacities for datum-points. Ideally, datum-points are partitioned into sets such that as much of the capacity of the page of storage as possible is actually utilized for the storage of datum-points, thus minimizing the number of pages in the database.

Mapping to the Hilbert Curve induces a logical ordering of pages, similar to the ordering of points on the Hilbert Curve. All of the datum-points on any page map to lower one-dimensional values, that are called derived-keys in this document, than do all of the datum-points contained on all succeeding pages. In the preferred embodiment of the invention, the lowest derived-key corresponding to any datum-point placed on a page, when the page is created, becomes the index key for the page. Such index keys are called page-keys in this description. If the point whose derived-key is its page's page-key is subsequently deleted, the page's page-key may be left unchanged or else it may be replaced with the lowest derived-key of any datum-point remaining on the page. The first page is an exception in that it is indexed by the value of zero, corresponding to the first point on the curve.

Page-keys are placed in a one-dimensional index together with their corresponding logical page addresses in computer memory. Alternatively, pages can be indexed using page-keys that are the highest derived-keys of datum-points held on the page.

A third alternative is to index pages using pairs of page-keys. One is the lowest derived-key of any datum-point stored on the page and the other is the highest. In this variation of the indexing method, pages in the database correspond to consecutive sections of curve that are not contiguous; that is, some sections of curve on which no datum-points lie are not logically held in the database or its index. This method allows the avoidance of searching some parts of the dataspace known not to contain datum-points.

Insertion of a datum-point into the database entails mapping the datum-point's coordinates to its sequence number, or derived-key, and placing or storing the datum-point on the page that corresponds to the section of curve on which it lies. The format in which the datum-point is stored on the page is independent of the present invention and any suitable format can be used.

Note that the approach described here partitions data rather than the space in which it lies. It adapts easily on update, that is, insertion and deletion of datum-points. For example, if a page becomes full, half of the datum-points whose derived-keys are greater or less than those of the other half can be moved to a new page or some other similarly defined portion may be moved to a logically adjacent page. In other words, the same approach used for partitioning a collection of one-dimensional values in the one-dimensional B-Tree or one of its variants, such as the $B^+$-Tree, can be used for partitioning multi-dimensional data. Alternatively, the approach adopted in the B*-Tree may be used instead, where the capacity of a page is reached, some of the datum-points are moved to a logically neighbouring page. When two neighbouring pages become 'full', a new third page is created and the datum-points stored on the original 2 pages are divided between them and the new third page.

Mapping multi-dimensional data to one-dimensional values enables the use and exploitation of a single, simple and compact B-Tree index, or one of its variants or any other one-dimensional indexing method, to index for the purpose of gaining access to the data. Use of this type of data structure also enables the processing of updates (insertions of data or deletion of data) without the need for significant reorganization of data within the database. In contrast to other data storage systems comprising the prior art, the present invention is 'well-behaved' in all respects.

The B-Tree is described in "Organization and maintenance of large ordered indexes" by R. Bayer and C. McCreight in *Acta Informatica*, 1(3):172–189, 1972. The $B^+$-Tree and the B*-Tree are attributed to D. Knuth in "The art of computer programming; volume 3: searching and sorting", published by Addison-Wesley, 1973.

FIG. 3 shows an example of a 2-dimensional database. Pages are labelled with numbers which indicate their address in computer memory. The boundaries of pages within space are shown as broken lines. In the example, all of the pages have the same capacity, the capacity of one page is 4 datum-points and each page's page-key is taken to be the lowest derived-key of any datum-point stored on the page, except for the first page whose page-key is zero. The set of pages is indexed using a one-dimensional index method. A single index entry comprises a pair of values; one element of this pair being a page-key and the other being a reference or address that enables the corresponding page to be located in computer memory. Page index entries are ordered by their page-key values. Page numbers, or addresses, are assigned, or allocated, in the order in which the pages are created. The index contains the following entries:

page-key: 00000000 (0 decimal), page number: 1
page-key: 01001000 (72 decimal), page number: 2
page-key: 01101000 (104 decimal), page number: 3
page-key: 01111100 (124 decimal), page number: 4
page-key: 10000010 (130 decimal), page number: 5
page-key: 10001100 (140 decimal), page number: 6
page-key: 10101100 (172 decimal), page number: 7
page-key: 11100000 (224 decimal), page number: 8

Queries are executed by identifying and searching pages whose corresponding curve sections intersect with the set of curve sections that lie within, or pass through, a query region. A query region is an n-dimensional rectangular volume within the space that defines the domain of the database. The present invention's strategy for executing queries pivots on an algorithm for calculating the index entries of successive pages that intersect with the query region. This may be done in a 'lazy' manner; that is, successive pages intersecting with the query region are identified, retrieved from the database and searched on demand. Alternatively, all of the pages that intersect with a query region may be determined before any is retrieved and searched. The manner in which pages that intersect with a query region are identified is described in detail in Section 4 of this description of the present invention.

In a practical application, the capacity of a page to store datum-points may amount to hundreds or thousands of datum-points. Pages may all have the same fixed datum-point or storage capacity or else they may vary in their capacities.

2 The Hilbert Curve

The concept of a space-filling curve is originally attributed to Giuseppe Peano, who, in "Sur une courbe, qui remplit toute une aire plane (on a curve which completely fills a planar region)" in *Mathematische Annalen*, 36:157–160, 1890, expressed it in mathematical terms and represented the coordinates of points in space with a ternary radix. The first graphical, or geometrical, representation of space-filling curves is attributed to the mathematician David Hilbert who described the 2-dimensional case in his paper "Ueber stetige Abbildung einer Linie auf ein Flachenstuck", *Mathematische Annalen*, 38:459–460, 1891.

Without loss of generality, an understanding of the way in which the Hilbert Curve is drawn is gained from the 2-dimensional embodiment illustrated in FIGS. 4 to 5 showing the first 3 steps of a potentially infinite process. In FIG. 4 a square is initially divided into 4 quadrants, or, more generally, into $2^n$ 'quadrants' in n dimensions, and a line, or 'first order curve', is drawn through their centre points which are ascribed sequence numbers in the order in which the curve passes through them. The first order 2-dimensional Hilbert Curve is regarded as passing through the 4 points in a space that lie at the centres of the quadrants illustrated. The sequence in which the curve passes through the quadrants defines an ordering of the quadrants. The decimal sequence numbers of these points are shown adjacent to them. Decimal coordinate values are shown along the vertical and horizontal axes. The location in space of each point on a first order curve is defined by coordinate values for each dimension.

It was noted in Section 1 of this description of the present invention that the sequence number of a point lying on the Hilbert Curve is called a derived-key in this document. This term is also used to refer to the sequence number of a quadrant within a space containing 4 quadrants in 2 dimensions or $2^n$ 'quadrants' in n dimensions. Whether usage of the term relates to the sequence number of a point on the Hilbert Curve or to a quadrant in a space is clear from the context.

The quadrants are ordered such that any two that are adjacent in the ordering share a common edge. In the next step, shown in FIG. 5, each of the quadrants of FIG. 4 is divided into 4 and, in all, 4 'scaled-down' first order curves are drawn and connected together. This produces a second order curve. Sequence numbers and coordinates are shown as binary numbers in FIG. 5. In 2 dimensions the curve passes through a space containing 16 points. Note that the first and last first order curves have different orientations to the one drawn in the first step so that the adjacency property of consecutive squares is maintained.

FIG. 6 shows the third step, producing a third order curve passing through a space containing 64 points. The first point on the curve lies in the bottom left hand corner and the last, or 64-th, point lies in the bottom right hand corner.

To specify the coordinates of the points in the space of FIG. 4 only a single bit (binary digit) is needed but for the ordinal positions on the line two bits are needed. The ordinal mapping established by the first order Hilbert Curve is thus:

<0,0>→00, <0,1>→01, <1,1>→10 and <1,0>→11.

In this notation, the term <1,0>→11, for example, is read as: the point whose first and second coordinates are 1 and 0 respectively (<1,0>) maps to the sequence number, or derived-key, of 11 (binary) or 3 (decimal).

For the points in the space of the second order Hilbert Curve two bits are required for the coordinates and four bits for the ordinal numbers and the mapping established by this curve begins:

<00,00>→0000, <01,00>→0001, <01,01>→0010, <00,01>→0011, . . .

In practical applications this potentially infinite process is terminated after k steps to produce an approximation of the Hilbert Space-filling Curve called the Hilbert Curve of order k. This passes through $2^{2k}$ squares, the centre points of which are regarded as points in a space of finite granularity of points.

Hilbert Curves passing through spaces containing more than 2 dimensions are constructed in a similar manner. In 3 dimensions, the first order curve is constructed by dividing a cube into 8 smaller cubes and ordering them so that consecutive cubes share a common face. Each one of the coordinates of a point is also expressed using 1 binary digit and the derived-key of the point is expressed using 3 binary digits. In 4 dimensions, the first order curve is constructed by dividing a hyper-cube into 16 smaller hyper-cubes and ordering them so that consecutive hyper-cubes share a common 3-dimensional hyper-surface. Each one of the coordinates of a point is expressed using 1 binary digit and the derived-key of the point is expressed using 4 binary digits. The concept readily extends both into higher dimensional spaces and to orders of curve higher than 1.

Generalizing the concept into n dimensions for the Hilbert Curve of order k, the Hilbert Curve passes through $2^{nk}$ points. Each coordinate, or attribute, of a point in n dimensions is expressed using k bits and the derived-key of the point is expressed using nk bits.

The 2-dimensional examples of the embodiment of the Hilbert Curve shown in FIGS. 4 to 6 have their first points on the curve in the bottom left hand corners of the illustrations. Other embodiments of the Hilbert Curve can also be used to equal effect where, for example, the orientations of the curves are inverted. In this alternative, the first points on the Hilbert Curves are those lying in the top left hand corners of the illustrations. This notion applies equally in n-dimensional spaces.

More generally, alternative embodiments of the n-dimensional Hilbert Curve of order k are constructed by beginning the process by defining the first order curve as starting at any of the points in a space containing $2^n$ points and ending at any point adjacent to the first point. 2 adjacent points on the first order differ in the value of one of their coordinates only.

Any embodiment of the Hilbert Curve can be utilized in the present invention for defining the derived-keys of points.

A characteristic of the preferred embodiment of the first order Hilbert Curve is that the sequence in which it passes through points is symmetrical about a hyper-plane that passes between the first and last points, where a hyper-plane is the n-dimensional equivalent of a line in 2 dimensions or a 2-dimensional plane in 3 dimensions. It is possible, however, to construct an embodiment of the Hilbert Curve which does not have this characteristic.

3 Techniques for Hilbert Curve Mapping

For the present invention to be practicable, a suitable method is required for calculating mappings, that is, for calculating the derived-key of a point with a given set of coordinates in n-dimensional space of finite granularity of points and for calculating the coordinates of the point that corresponds to a particular derived-key. Such a method is also required for the querying algorithm, described later.

One method of performing these calculations for points arranged in grids in spaces of 2 or more dimensions is given in "Using state diagrams for Hilbert Curve mappings" by J. K. Lawder, Technical Report BBKCS-00-02, Birkbeck College, University of London, August 2000, in which state diagrams are utilized. This adapts and extends a generic technique for space-filling curves originally proposed in "Space-filling curves: their generation and and their application to bandwidth reduction" by Theodore Bially, *IEEE Transactions on Information Theory*, IT-15(6):658–664, Nov 1969. State diagrams are stored in the memory, either volatile or permanent, of a computer. The size of a state diagram increases exponentially with the number of dimensions in a space and for practicable purposes they become too large to store in volatile memory for more than about 9 dimensions, given the current state of computer hardware technology.

An alternative method of performing the mapping calculations is given in "Calculation of mappings between one and n-dimensional values using the Hilbert Space-Filling Curve" by J. K. Lawder, Technical Report BBKCS-00-01, Birkbeck College, University of London, August 2000, in which calculations are performed without the aid of state diagrams or the need to store them in the memory of a computer. That report is an adaptation and amplification of a technique describe in a paper "Alternative algorithm for Hilbert's space-filling curve", by Arthur R. Butz, *IEEE Transactions on Computers,* 20:424–426, April 1971. In effect, the characteristics of any particular state are calculated on demand, or 'on the fly', as required during a mapping process.

Alternatively, the present invention can be implemented using any algorithm for calculating Hilbert Curve mappings between multi-dimensional data and one-dimensional values.

Without loss of generality, the mapping process is illustrated for the 2-dimensional case in the following manner.

The recursive way in which space is partitioned during the Hilbert Curve construction process can be expressed in a tree structure as exemplified in FIG. 7. This conceptual view aids an understanding of the mapping process. Each node corresponds to a first order curve and a collection of nodes at any tree level, k, describes a curve of order k, where the root resides at level 1. Thus the root node corresponds to the first order curve of FIG. 4 and the leaf nodes correspond to the set of first order curves comprising the third order curve of FIG. 6.

Alternatively, a node is viewed as a sub-space enclosing $2^n$ nested sub-spaces, or quadrants, except that a leaf node encloses $2^n$ points. The ordering of quadrants in a node reflects the sequence in which the Hilbert Curve passes through points contained in the quadrants.

Recall that the binary sequence number of a quadrant within a node (also equivalent to a point on a first order curve) is called the derived-key. Alternatively, it is referred to as a quadrant number. The concatenated (single-bit) coordinates of a 'quadrant' within a square, cube or hypercube or of a point on a first order curve is referred to in this description as an n-point. Thus an n-point encapsulates the location within a node or space of a quadrant in relation to other quadrants in the same node or space.

Also recall a derived-key of a point lying on a Hilbert Curve of order k contains nk bits; the same as the sum of the bits in all of the coordinates of a point.

How the mapping from the coordinates of a point to its derived-key takes place is illustrated with the example of point P lying on a third order Hilbert Curve shown on FIG. 6 and FIG. 7. Its coordinates are <110, 100>. Initially the derived-key of P is unknown and designated by the binary bit string '??????', where a question mark designates a bit of unknown value.

Step 1: Concatenate the top (or left-most or most significant) bits of the coordinates of P to form the n-point 11. This locates P in quadrant number 10 in the tree's root node. This quadrant is emphasized in bold in FIG. 7. The derived-key of P is now '10????'.

Step 2: Concatenate the next lower (ie middle) bits of the coordinates of P to form the n-point 10. Locate this n-point within the tree level 2 node pointed to by the quadrant identified in the root, in step 1. This places the point in the quadrant number is 11. The derived-key of P is now '1011??'.

Step 3: Concatenate the bottom (or right-most or least significant) bits of the coordinates of P to form the n-point 00. Locate this n-point within the tree level 3 node pointed to by the quadrant identified in the previous step. This places the point in the quadrant number 10. The derived-key of P is now '101110'.

An inverse mapping, from a derived-key to the coordinates of a point, is carried out in a similar manner.

It is not practicable to store the tree representation of the Hilbert Curve in memory for calculating mappings for any useful value of order of curve. However, a tree contains a finite number of types of node. Different types of node (equivalent to different orientations of first order curve) can be regarded as being different states enabling the tree structure to be expressed more compactly as a state diagram.

In FIG. 7, different nodes that are the same type are labelled with the same node type number. Each distinct type corresponds to a distinct state in a state diagram.

A graphical representation of the state diagram that summarises and encapsulates the tree shown in FIG. 7 is shown in FIG. 8. In FIG. 8, the vertical axis and horizontal axis coordinates of the centre point of a sub-square are shown concatenated and enclosed in round brackets. Corresponding sequence numbers are shown in square brackets. Whereas the tree shown in FIG. 7 encapsulates an embodiment of the third order Hilbert Curve, the state diagram encapsulates the Hilbert Curve of any order, or tree of any height. Different state diagrams encapsulate different embodiments of the Hilbert Curve.

The minimum number of states, or orientations of first order curves, required to encapsulate the Hilbert Curve of any order is given by the expression $2^{n-1}$.

A method of constructing state diagrams for the Hilbert Curve is given in the aforementioned PhD thesis of the present inventor.

Referring to states in a state diagram is a convenient and concise way of describing the mapping process. Nevertheless, mappings may be calculated instead without the aid of state diagrams, for example, using the techniques described in the aforementioned Technical Report number BBKCS-00-01.

As noted previously, the mapping techniques can readily be applied to spaces of more than 2 dimensions. In 3 dimensions, a node in the tree, corresponding to an instance of a state or a first order curve, comprises 8 cubes, if it is a non-leaf node, or 8 points if it is a leaf node. In 4 dimensions, a node comprises 16 hyper-cubes or points. Generally, in n dimensions, a node comprises $2^n$ hyper-cubes or points.

For convenience, this description uses the term quadrant to refer to squares, cubes and hyper-cubes, regardless of the value of n (number of dimensions in the space).

The precise form of the Hilbert Curve used in the storage and retrieval of multi-dimensional data is determined by the mapping algorithm used.

The preferred embodiment of the Hilbert Curve used in the description of the present invention is defined by using either the state diagram method for mapping between n-dimensional and one-dimensional values described in the aforementioned Technical Report BBKCS-00-02 and the PhD thesis of the present inventor or by using the calculation method described in the aforementioned Technical Report BBKCS-00-01 and the PhD thesis of the inventor. However, any other mapping algorithm can be used to equal effect.

In the preferred embodiment of the Hilbert Curve of order k, all of the coordinates of the first and last points on the curve are zero-valued except for the first coordinate of the last point which has the value $2^k-1$. The present invention can be adapted to suit any embodiment of the Hilbert Curve for which mapping algorithms can be defined.

Ways in which mapping algorithms to suit alternative embodiments of the symmetrical Hilbert Curve can be generated are described in the aforementioned PhD thesis of the present inventor.

4 The Data Retrieval Process

The present invention most importantly includes a method to enable the identification for retrieval of datum-points lying within hyper-rectangular query regions, or query ranges. A hyper-rectangle is the equivalent in n-dimensional space of a rectangle in 2-dimensional space, where n>2. The data retrieval method is described in this Section and assumes that the mapping algorithms described in Section 3 of this description of the present invention are used to define the form of the Hilbert Curve. The retrieval method can be adapted to suit alternative embodiments of the Hilbert Curve and alternative ways of indexing pages of data.

4.1 The Querying Strategy

The description that follows assumes the embodiment of the invention in which each page of data is indexed using the page-key that is the lowest derived-keys of any datum-point placed on it.

FIG. 9 shows the querying strategy of the preferred embodiment of the invention. This process includes identifying the pages that intersect with a query region.

Initially a query 80 is specified by defining a hyper-rectangular query region. Each query region is defined by a pair of points in the data space. One is called the lower bound and all of its coordinate values are equal to the minimum coordinate values of any point in the query region. The other is called the upper bound and all of its coordinate values are equal to the maximum coordinate values of any point in the query region. The coordinates of these points are, respectively, $<l_1, l_2, \ldots l_n>$ and $<u_1, u_2, \ldots u_n>$ such that $min_i \leq l_i \leq u_i \leq max_i$. The value $min_i$ is the minimum coordinate value of any point in the query region and the value $max_i$ is the maximum coordinate value of any point in the query region. This type of query is called a range query.

The identification of pages intersecting with the query region is effected by a function or algorithm referred to in this description as calculate_next_match. This function calculates the lowest derived-key that is greater than or equal to another derived-key, called the current-page-key in this description, and which is the derived-key of a point within a specified query region. This lowest derived-key is called a next-match in this description.

Before the calculate_next_match function is called for the first time, the current-page-key is initialized to the value of 82 the derived-key of the first page in the database.

The calculate_next_match function is called 84 and its output is checked 86 to see if a next-match was found. The first time this function is called a next-match is always found and this is the lowest derived-key of any point lying within the query region is identified. The index is searched and the page that contains this point, if it is a datum-point, is identified 90. This page is then retrieved 92 from the database into an area of computer memory where it can be searched, if the page cannot be searched in-situ. The page is then searched for datum-points lying within the query region 94.

In the next step, the page most recently identified as intersecting with the query region is checked to see if it is that last page indexed; that is, the page with the highest page-key 96. If it is the last page the query process terminates 98, otherwise, the current-page-key is set to the page-key of the next page listed in the index 100 and the calculate_next_match function is called again 84. Once no further next-matches can be found, the query process terminates 88.

The second and subsequent times that the calculate_next_match function is called, it finds, if it exists, the lowest derived-key of a point lying within the query region that is equal to or greater than the page-key (called the current-page-key) of the successor page to the one just searched. This derived-key is called a next-match in this description. Thus the function takes the current-page-key as input and outputs the next-match, if it exists. The current-page-key is initialized to zero in order to find the first next-match.

In the preferred embodiment of the invention, if the next-match is found, the page that may contain its corresponding datum-point is identified by searching the index for the highest page-key that is less than the next-match. The page indexed by this page-key is then retrieved from the database and searched for datum-points lying within the query region, either immediately or once all pages intersecting the query region have been identified. The process continues in this manner until no further next-matches can be found. The number of times that calculate_next_match is called equals the number of pages intersecting with the query region plus one.

Each query region intersects one or more curve sections. The Hilbert Curve can enter, leave and re-enter a query region a number of times or a query region can contain a single section of Hilbert Curve. The querying strategy identifies for retrieval and searching only those pages stored in the database whose corresponding sections of the Hilbert Curve intersect the query region.

Applying the process shown in FIG. 9 to the example database illustrated in FIG. 10, a query region is shown shaded and defined by lower and upper bound points. The current-page-key is initially the derived-key of the first point on the Hilbert Curve in the bottom left hand corner. The first time the calculate_next_match function is called, the derived-key of point B is calculated as the first next-match. The next-match is looked up in the index and found to lie between the page-keys of pages 3 and 4 which are the derived-keys of points A and G respectively. Page 3 is retrieved and searched for points lying within the query region. Next, the derived-key of point G becomes the current-page-key since it is the page-key of the successor page to the one just searched. The calculate_next_match function calculates the derived-key of point G itself as the next-match as it lies within the query region. Page 4 is then retrieved and searched. In the next iteration, the derived-key of point L is the current-page-key input to calculate_next_match and the next-match output is the derived-key of point N since it lies within the query region. Page 6 is retrieved and searched. In the final call to calculate_next_match, no next-match is found which is greater than the derived-key of point Q and the query terminates.

It can be seen that only pages intersecting with the query are retrieved and searched. Intervening curve sections corresponding to the other pages shown in the Figure are effectively 'stepped over', that is, not retrieved from the database for searching since they do not intersect with the query region.

In the preferred embodiment of the invention, pages to be searched are identified 'lazily', or on demand, in ascending page-key order. Each page intersecting the query region is searched before identifying the next page that intersects the query region. Alternatively, all of the pages can be identified before the first page is retrieved for searching.

Depending on the aims of the query, it may not be necessary to identify all of the pages that intersect with a query region or to search any or all of the intersecting pages. These aims are for the user of the invention to determine. The invention, however, accommodates these different aims.

In contrast to some approximations of space-filling curves other than the Hilbert Curve, knowledge of the derived-key values of the lower and upper bound points of the query region does not assist in the query process where the Hilbert Curve is used for mapping between n and one dimensions.

4.2 The Algorithm for the Calculate_Next_Match Function

This Section describes the calculate_next_match function in detail.

A number of terms are used in the description of the querying algorithm. The terms datum-point, derived-key, page-key and hyper-cube are defined in Section 1 of this description of the present invention. The terms n-point and quadrant are defined in Section 3. The terms query region, query range, lower bound, upper bound, hyper-rectangle, next-match and current-page-key are defined in Section 4.1.

A number of other terms are defined here as follows:

A range query is a query in which a query region is specified as being a space from which datum-points are searched for and retrieved.

A current-page-key-point is a point, expressed as a set of coordinates, corresponding to a page-key.

A current-search-space is a space that is a hyper-cube in form and in which is pursued the next-match in a particular iteration of the querying process. In the first iteration, the current-search-space is the whole space and in subsequent iterations it is a sub-space that is $\frac{1}{2^n}$ of the previous iteration's current-search-space.

A current-query-region is a hyper-rectangular space that is a sub-space of both the query region and the current-search-space in which is pursued the next-match in a particular iteration of the querying process. In the first iteration, the current-query-region is the originally specified query region and in subsequent steps it is the intersection of the current-search-space and the current-query-region of the previous iteration.

A current-quadrant is the quadrant within the current-search-space to which the latter is restricted at the end of an iteration of the querying algorithm.

A current-tree-level is a measure of the current level of the tree representation of the Hilbert Curve where the search for the next-match takes place during any particular iteration of the algorithm.

Initially, at the root of the tree, this is set to 1. It is incremented in each iteration of the search as the tree is descended. The height of the tree corresponds to the order of the Hilbert Curve used in the mapping. As noted previously, the order of the Hilbert Curve together with the number of dimensions in the data space determines the total number of points (potential datum-points) through which the Hilbert Curve passes.

A current-state encapsulates the ordering of quadrants, expressed as n-points, within the current-search-space; that is, a mapping between sequence numbers and quadrants. This term is also referred to as the current-node.

A next-state is defined similarly to the current-state except that it encapsulates the ordering of quadrants within the current-quadrant.

4.2.1 Overview of the Algorithm

The approach of the present invention to finding the next-match utilizes an iterative process (that, alternatively, can be implemented recursively) of partitioning of the current-search-space, that is initially the whole data-space. During each iteration, the current-search-space is conceptually divided into quadrants and these are searched to find a single quadrant, called the current-quadrant, in which to restrict and continue the search in the next iteration.

This approach allows a view of the data-space as a hierarchy of nested sub-spaces, each of which contains $2^n$ quadrants and this hierarchy is equivalent to the tree representation of the Hilbert Curve described in Section 3 of this description of the present invention. The set of $2^n$ quadrants within a sub-space is equivalent to a node in the tree. The search for the next-match is then equivalent to descending the tree from the root to a member of a leaf. Thus with each successive iteration of the algorithm, the tree is conceptually descended by one level (except where 'back-tracking' takes place, as described below). Except at the leaf level of the tree, the current-quadrant is the 'parent' of a node at the next lower level in the conceptual tree and this node becomes the current-search-space used in the next iteration. At the leaf level, the current-search-space contains $2^n$ points and the current-quadrant, if successfully found, is one of these points and it corresponds to the next-match. Finding the current-quadrant is not straightforward where mapping to the Hilbert Curve is utilized since quadrants in space may be ordered differently in different nodes as exemplified in FIG. 7. That is, quadrants with the same derived-keys but within different nodes may have different coordinate or n-point values. Recall that where state diagrams are utilized, a unique ordering of quadrants by their Hilbert Curve derived-keys within a node is referred to as a 'state' in a state diagram.

Initially, the next-match is an empty bit-string and once successfully calculated it contains nk bits, where n is the number of dimensions in the data space and k is the order of the Hilbert Curve. As the tree representation of the Hilbert Curve is descended, successively lower groups of n bits are calculated.

Once identified, the current-quadrant within the current-search-space is the quadrant that intersects with the current-query-region and either encloses the current-page-key-point or, if the latter does not lie within it, contains points whose derived-keys are minimally greater than the current-page-key. In preparation for the next iteration in the preferred embodiment of the invention, in addition to restricting the current-search-space to that part that intersects with the current-quadrant, the current-query-region is also restricted in a similar manner.

On successful completion of each iteration, n bits of the value of the next-match are, at least tentatively, identified and appended to any previously identified (higher) bits in the next-match that is in the process of being calculated. These n bits are specifically the derived-key of the current-quadrant, that is, the sequence number of the current-quadrant within the current-search-space.

If, during any iteration of the algorithm, the current-query-region is found to coincide with the current-search-space, then the search can be completed immediately, without it being necessary to continue searching nodes at successively lower levels within the tree. When such a coincidence occurs, either the current-page-key-point also lies within the query region or else it does not. If the current-page-key-point does lie within the query region then the current-page-key is itself the next-match to the query. Otherwise, where the current-page-key-point does not lie within the current-search-space the next-match is the lowest derived-key of any point within the current-query-region and all unresolved bit values within the next-match are immediately set to zero. Thus the coincidence of the current-query-region and the current-search-space can enable the next-match to be determined in a number of iterations less than the height of the tree, or order of the curve.

If nodes are required to be searched at all levels down to and including the leaf level of the tree and a current-quadrant lying within the query region is found then it contains a single point whose derived-key is the next-match.

In order, at the end of each iteration of the algorithm, to identify the current-quadrant that maps to the lowest suitable derived-key in which to restrict the search, conceptually, a representation of nodes is utilized in which quadrants are ordered by their derived-keys. The search of a node then takes the form of an iterative binary search of the derived-keys of the quadrants within the node. In each iteration of this binary search, what remains of the current-search-space (initially a whole node) is divided into two halves, each of which contains one or more quadrants. In the next iteration (of the binary search), the search is restricted to one or the other of these halves, thus one half is discarded. The derived-keys of the quadrants in one half are all lower than those of the other. These are referred to as lower and upper halves. These terms do not relate to the locations in space of the quadrants (ie, their coordinates or n-points) but to their derived-keys.

Recall, however, that the current-query-region is expressed as the coordinates of the lower and upper bound points. The derived-keys of these points say little about which quadrant sequence numbers of the current-search-space intersect with the region. Thus, given a set or sub-set of ordered derived-keys representing the sequence in which the Hilbert Curve passes through quadrants within a node, a method is needed for determining whether the current-query-region intersects with the lower half of the quadrant derived-keys or the upper half of the quadrant derived-keys or both. This method is given in Algorithm 3 (FIG. 10C) and in the description of the detail of its implementation, in Section 4.2.2 of this description of the present invention.

Sometimes, where the current-query-region intersects with a sub-set of quadrants containing the current-page-key-point, the search for the next-match ultimately fails at a lower level in the tree. This occurs when no current-quadrant can be found in which to continue the search. That is, where the quadrant containing the page-key-point doesn't intersect with the query region and no quadrant with a higher derived-key intersects with the query region.

In such cases, it will be possible to back-track, that is, to conceptually ascend the tree and revisit a node at a higher level, and continue the search in another sub-set of quadrants if and only if a sub-set was previously found to intersect with the current-query-region and it contains quadrants enclosing points mapping to higher derived-keys than the current-page-key. Any such sub-set of quadrants will correspond to a search-space that is larger than the current-search-space. This sub-set will not correspond to the whole of a node within the tree. As the binary searches of nodes progress, details of sub-spaces to which back-tracking can take place, if necessary, need therefore to be identified and recorded. Every such sub-space that is found is smaller than any other found previously and thus it renders them obsolete.

Back-tracking to a higher level in the tree requires the removal of n lower order bits from the, as yet incompletely calculated next-match. n bits are removed for each level of ascension. The current-search-space is restored to a larger space previously 'visited' during an earlier iteration of the algorithm. The corresponding earlier current-state and current-tree-level are also restored.

In the absence of any sub-space having been identified to which the search may return, a requirement to back-track implies that no next-match equal to or greater than the current-page-key exists and, therefore, that the query process is complete. Conversely, an opportunity to back-track implies that the next-match is guaranteed to exist, whether or not this opportunity is subsequently required.

Generally, it is noted that while the search for the next-match continues, it is tentative either until after back-tracking has taken place, if it is required, or until the current-query-region is found to coincide with the current-search-space.

If and once back-tracking to some sub-space (sub-set of quadrants in a node at a higher level in the tree searched in the previous iteration of the algorithm) does takes place, the search may proceed in a more straightforward manner and without regard to the value of the current-page-key since the search will be satisfied by the lowest derived-key of any point within that part of the query region that intersects with the sub-space. Note that all points enclosed within this sub-space map to higher derived-keys than the current-page-key. It is no longer necessary to identify further sub-spaces to which back-tracking may return since this process is only required at most once in any search.

The algorithm described in this Section is implemented by examining the values of one bit from each coordinate of both the lower and upper bounds of the query region and n bits from the current-page-key at each level of the tree during each iteration of the algorithm, starting with the most significant bits and progressing to the least significant bits.

It is instructive to consider the notion that if an n-point A is defined by taking the top bit from each of the coordinates of a point B, then A approximates the position in a space of point B. Thus, if a space is divided into quadrants then A specifies in which of these that point B lies. This quadrant can be labelled quad$_A$. In a similar fashion, it can be seen that an n-point C can be defined by taking the second from top bit from each of the coordinates of point B and it approximates the position of B within quad$_A$. This process can be repeated to a depth equal to the number of bits that are used to represent a coordinate value. These concepts, related to points, are readily applied to ranges since they are specified by 2 points; the upper and lower bound points.

Recalling the definition of an n-point it is noted that in the present context an n-point is a set of one-bit coordinates, that locate a quadrant within a current-search-space, concatenated into a single n-bit value. A mapping to a first order curve is established by ordering the n-points and ascribing them with their sequence numbers.

4.2.2 Detailed Description of the Algorithm

In this Section, the algorithm is presented for the Hilbert Curve that is implemented as the calculate_next_match function. The description is followed with a commentary on how the main operations performed within it can be implemented.

References to 'states' are made in the algorithm. In this context, a state encapsulates the ordering of quadrants within the space corresponding to a node in the tree according to their derived-keys. Thus a state is a particular type of node in the tree representation of the Hilbert Curve and it encapsulates a mapping between derived-keys and n-points of quadrants in a node. Where state diagrams are used for mapping calculations, a state is represented by its state number in the state diagram. Given the number of the current-state and the derived-key of a quadrant, its n-point can be looked-up in the state diagram as can its next-state number for use in the next iteration of the algorithm. The initial state is taken to be the first state in the state diagram, usually numbered state 0.

Where state diagrams are not used, a state is encapsulated by the values of a number of variables. An example of a set of such variables is given in Section 4.2.3 of this description of the present invention below and they are called J, $\tau$ and $\omega$ in that Section. Each distinct state is characterised by a different set of values for these variables. Their values are used in calculation processes described below to find the n-point of a quadrant with a particular derived-key in a particular state and its next-state. Initially, these variables are all given 0 as their values. The algorithm described in this Section contains two loops. Each of these loops includes a binary search. The first loop (see FIG. 10A, Algorithm 1) is executed until one of three possible conditions arises:

1. the current-page-key is found to be its own next-match.
2. the current-page-key is found not to be its own next-match but that the next-match does exist.
3. it is found that the next-match does not exist.

The first condition arises when it is found that the current-page-key-point lies within the current-search-space that is coincident with the current-query-region. This signifies completion of the search for the next-match. In this case the second loop is not executed.

The second condition arises when it is found that the current-page-key-point does not lie within the query region but that the latter intersects with a part of the search space whose points map to higher derived-keys than the current-page-key. This will occur once back-tracking takes place but may also occur when it is not required. In this case, execution breaks out of the first loop and the second loop is entered.

The third condition arises when it is found that the current-page-key-point lies within a quadrant whose derived-key is greater than that of any that intersects with a current-query-region and that no sub-space has previously been identified to which back-tracking may return. Both the search for the next-match and the execution of the query now terminate, since the current-page-key is greater than the highest derived-key of any point within the query region. In this case the second loop (see FIG. 10B, Algorithm 2) is not executed.

During execution of the first loop, successively lower sets of n bits of the next-match are calculated, but only tentatively, as explained previously. Sub-spaces to which back-tracking may return if required are also identified during its execution.

When the second condition arises, control is passed to the second loop that behaves in a similar but simpler manner than the first loop. Its purpose is to find the lowest derived-key of any point within the current-query-region and, therefore, the value of the current-page-key is no longer of interest. Iteration of the second loop may terminate early without it being necessary to search nodes at all levels down to the leaf level of the tree if the current-query-region is coincident with the current-search-space.

Once the second loop has been entered, no requirement to back-track will ever arise.

The total number of iterations of both loops cannot exceed twice the order of the curve used in the mapping, and depends on whether back-tracking and/or a search of nodes at all levels down to the leaf level of the tree is required. This defines the upper bound to the computational complexity of the algorithm.

Binary searches of nodes or states are performed in both loops.

The algorithm that calculates the next-match is broken into three parts and is given in FIGS. 10A–10C. The first is an overview, given in Algorithm 1 (FIG. 10A). It does not include the detail of the second loop referred to above but indicates where control is passed to it. Neither does it include the detail of the binary search of quadrants within a node. The second part details the operation of the second loop and is given in Algorithm 2 (FIG. 10B). The third part, in Algorithm 3 (FIG. 10C), provides the detail of the binary search of a node containing the quadrants that make up the current-search-space. Symbols used in the Algorithms are defined in FIG. 1.

Comments within the Algorithms are enclosed in 'curly braces': '{' and '}'.

Initially the current-search-space is the whole of the data space through which the Hilbert Curve passes, by implication.

This Section is concluded with a commentary on the main operations performed in the algorithm, given in the order of their execution.

Step 1: (Algorithm 1:FIG. 10A, Line #8: Algorithm 2:FIG. 10B, Line #6) By visualizing space as a hierarchy, ie a tree, a query region lower bound (or upper bound) point is located within a particular quadrant of the root node by examining the top, or most significant, bit of each of its coordinates.

Lower bits are examined at lower levels in the tree representation of the Hilbert Curve. Similarly, the k-th bits of the coordinates determine the quadrant at the k-th level of the tree in which the point lies. Thus at each iteration of the statement in this step of the Algorithm, the k-th bits of the coordinates of the lower and upper bound points of the current-query-region are extracted. For both points these n single-bit values are concatenated into n-points for use in other steps. These values are referred to below as $Q_{lower}$ and $Q_{upper}$.

Step 2: (Algorithm 1:FIG. 10A, Line #9) A similar operation is performed by the statement in this step except that in each iteration n bits of the current-page-key are extracted, starting with the most significant bits when the current-tree-level is 1, corresponding to the root. These n bits are the derived-key of the quadrant within the current-search-space containing the current-page-key-point. It is noted that this step is not required in Algorithm 2.

Step 3: (Algorithm 1:FIG. 10A, Line #10: Algorithm 3:FIG. 10C) During each iteration of the binary search, the number of quadrants within the current-search-space is reduced, in which the next-match is pursued, by half until finally the current-quadrant remains (if the binary search completes successfully). The quadrants are ordered under the mapping and so their derived-keys, in the range $[0, \ldots, 2^n-1]$, are known by implication. Their coordinates are not known but may be found from the state diagram in which they are stored as n-points. Alternatively, they are calculated, for example, in the manner described in Section 4.2.3 of this description of the present invention if state diagrams are not used.

Whether the query intersects with the half of the sub-set of quadrants of current interest whose derived-keys are the lowest is determined in the manner described below.

If the derived-keys of a sub-set of quadrants are in the range

[lowest, . . . , max-lower, min-higher, . . . , highest]

then all of the quadrants whose derived-keys are in the lower sub-range

[lowest, . . . , max-lower]

have the same value, 0 or 1, in their coordinates in one particular dimension, i. Similarly, all of the quadrants whose derived-keys are in the higher sub-range

[min-higher, . . . , highest]

have the opposite coordinate value, 1 or 0, in the same dimension, i. This characteristic does not apply in any other dimension.

Recall that quadrants whose derived-keys are consecutive are adjacent in space. Thus the n-digit number that contains a single non-zero bit corresponding to the dimension, i, that divides this range into two is evaluated by $$\text{partitioning\_dimension} \leftarrow d\_to\_c \text{ (max-lower)} \oplus d\_to\_c \text{ (min-higher)} \quad (1)$$

where d_to_c is a function that takes the derived-key of a quadrant as its parameter and returns its coordinates expressed as an n-point by looking up its value in the state diagram (or by calculating it where state diagrams are not used, in the manner described, for example, in Section 4.2.3) of this description of the present invention.

It now remains to be found whether the quadrants whose derived-keys are in the lower sub-range all have the value of 0 or all have the value of 1 in dimension i. This is done by testing the value of the expression $$d\_to\_c \text{ (max-lower)} \land \text{partitioning\_dimension} \quad (2)$$

If this expression evaluates to non-zero, then these quadrants all have the value 1 in dimension i, otherwise they have the value 0.

Knowledge of this value enables it to be determined whether the query region intersects with quadrants mapping to derived-keys in the lower half of a sub-set of quadrant derived-keys or with quadrants mapping to derived-keys in the upper half of a sub-set of quadrant derived-keys or with quadrants mapping to derived-keys in both halves.

Finally, recall that in each iteration of the algorithms in Algorithm 1 and Algorithm 2, the current-query-region is successively restricted to the intersection of the originally specified query region and successively smaller current-search-spaces. Thus for the current-query-region to intersect with the quadrants whose derived-keys are in the lower sub-range, either or both of the lower and upper bounds of the current-query-region must have the same value in its coordinate for dimension i as these quadrants.

Whether the current-query-region intersects with the half of the sub-set of quadrants of current interest during an iteration of the binary search whose derived-keys are in the higher sub-range is determined in a similar manner to that described above.

Once the binary search has been completed, the derived-key of a single quadrant, called the current-quadrant, is identified. This, at least tentatively, contains the next-match and so the current-search-space is restricted to it prior to the next iteration of the algorithm. This is described below in 'Step 4'.

Step 4: (Algorithm 1:FIG. 10A, Lines #14–17: Algorithm 2:FIG. 10B, Lines #8–11) Once the coordinates, expressed as an n-point, of the current-quadrant in which to pursue the search in the next iteration of the algorithm (Algorithm 1 and Algorithm 2) have been identified, restricting the current-query-region is achieved by comparing this n-point with the values of $Q_{lower}$ and $Q_{upper}$ found in step 1.

Coordinates of the current-query-region's lower bound are set to zero in dimensions corresponding to bits that are set to 1 following an EXCLUSIVE-OR operation between the quadrant's n-point and $Q_{lower}$. Bits in upper bounds coordinates are all set to to 1 following a similar EXCLUSIVE-OR operation between the n-point and $Q_{upper}$.

Adjusting the coordinates of the current-query-region's bounds in this simple manner corrupts bit values in the query region's lower and upper bounds corresponding to higher levels than the current-tree-level. This is not important since their original values will have been processed in previous iterations of the algorithm.

Step 5: (Algorithm 1:FIG. 10A, Lines #18–21) In order to determine whether the current-query-region coincides with the current-search-space, two n-bit variables, one for each of the query bounds, are maintained. Whenever a query region's lower or upper bound coordinate is adjusted in step 4, the corresponding bit is set to 1 in one of these variables. When all of the bits in both of these variables have been set to 1, this signifies that the current-query-region coincides with the current-search-space. This enables the descent of the tree to be curtailed since the current-page-key-point must lie within the query region and so the current-page-key must be its own next-match.

Similarly, in lines 2–5 of Algorithm 2, coincidence of the current-query-region and the current-search-space enables further searching of nodes in the tree to be avoided since the next-match must be the lowest derived-key within the current-search-space. All unresolved lower bits within the next-match can immediately be set to zero.

4.2.3 Application of the Algorithm in Higher Dimensions

The algorithm for the calculate_next_match function described above can be applied where mapping to the Hilbert curve is performed by calculation without the aid of state diagrams. Thus the algorithm can be applied where the number of dimensions in space exceed the upper limit imposed by main memory requirements of state diagrams.

The design and functionality of the algorithm do not need to be modified to avoid the usage of state diagrams but the detail of the implementation of those parts of the algorithm that pertain to mapping or partial mapping calculations and the definition of the current-state and next-state need to be adapted to suit the particular mapping method used. That this is possible and the preferred manner in which to do this is demonstrated using a working example of source code listing written in the ANSI Standard 'C' computer programming language given in Section 4.2.4 of this description. This example also aids the understanding of the algorithm.

This example utilizes the embodiment of the Hilbert Curve defined by the mapping technique described in the aforementioned Technical Report BBKCS-00-01, in the aforementioned PhD thesis of the present inventor and in the aforementioned paper by Arthur R. Butz.

Similarly, the algorithm for calculating the next-match can be implemented where any other calculated mapping procedure is available for the Hilbert Curve.

A commentary of the calculations carried out in the example program is given in this Section, in Section 4.2.4 of this description of the present invention and also in 'comments' included in the source code. Comments are delimited in the 'C' programming language by the character pairs '/*' and '*/'. Names of variables used in the source code are correlated with variable names used in Technical Report BBKCS-00-01 and in the paper by Arthur R. Butz, in FIG. 2. The semantics of these variables is given in the PhD thesis of the present inventor.

Note that Butz' method of mapping from derived-keys to coordinates (and the inverse mapping) also conceptually entails an iterative descent of the tree representation of the Hilbert Curve in a similar way that mappings using state diagrams do. In each iteration, n bits of the derived-key are taken and transformed into the coordinates of a point.

Three critical variables are required in the mapping process. These variables are referred to as J, $\tilde{\tau}$ and $\omega$ in FIG. 2. They encapsulate the characteristics of the current state, or the type of node at a particular level in the tree representation of the Hilbert Curve, and so enable the order or sequence of any quadrant within the tree node, or state, to be determined. A full account of the significance of these variables and how they correspond to the definition of a state in a state diagram is given in the PhD thesis of the present inventor. On commencement of the calculate_next_match algorithm, these variables are all initialized to zero and they are updated during each iteration for use in the next iteration.

Several calculations are performed during each iteration of the function calculate_next_match that implements this algorithm and these are described below and in the source code.

In 'Step 3' of the commentary in Section 4.2.2 of this description of the present invention, it was seen that the coordinates of two quadrants are required in each iteration of the binary search. The derived-keys of these quadrants were referred to as max-lower and min-higher. In the source code, they are referred to as LoHi_H and HiLo_H respectively. Their coordinates, expressed as n-points, enable it to be determined which dimension partitions a set of (ordered) quadrants, whose derived-keys only are known, into two halves. This was referred to as the partitioning_dimension in equation (1). In practice, however, it is possible to find the partitioning_dimension without having to perform complete mappings to both of these n-points.

In accordance with Butz' mapping algorithm, it is first necessary to calculate a values for each of the quadrants max-lower and min-higher. A $\sigma$ value is the n-point representation of a point, with a particular sequence number (derived-key), lying specifically on a first order curve of the same orientation as the one that defines the first step in the process of constructing the curve of any order. These are referred to here as L_$\sigma$ and H_$\sigma$ (and as variables tSL and tSH respectively in the source code). In practice, their calculation may be effected more simply than in the manner described by Butz, as $$L\_\sigma \leftarrow \text{max-lower} \oplus (\text{max-lower}/2) \qquad (3)$$

$$H\_\sigma \leftarrow \text{min-higher} \oplus (\text{min-higher}/2) \qquad (4)$$

From these two values, corresponding $\tilde{\sigma}$ values are found by performing right circular bit-wise shifts to produce L_$\tilde{\sigma}$ and H_$\tilde{\sigma}$. In the source code, these values are assigned to the variables tSL and tSH.

Instead of completing the mappings from max-lower and min-higher to their n-points (coordinates) and finding the partitioning_dimension in the combined operation:

$$(L\_\tilde{\sigma} \oplus \omega \oplus \tilde{\tau}) \oplus (H\_\tilde{\sigma} \oplus \omega \oplus \tilde{\tau}) \qquad (5)$$

it is only necessary to perform the calculation $$L\_\tilde{\sigma} \oplus H\_\tilde{\sigma} \qquad (6)$$

This simplification is possible since the EXCLUSIVE-OR operation is both commutative and associative and since $a \oplus a = 0$ and $a \oplus 0 = a$. Nevertheless, the coordinates of max-lower need to be calculated in order to carry out the computation given previously in equation (2).

Once the binary search has been completed, the derived-key of the current-quadrant is known. The coordinates of this quadrant are required in order to restrict the current-search-space for the next iteration of the algorithm (or recursive function call). There is a 50% probability that the derived-key of the current-quadrant is the same as max-lower from the final iteration of the binary search and so its coordinates will already have been calculated. At any rate, the values of $\sigma$ and $\tilde{\sigma}$ of the current-quadrant will already have been calculated.

The three critical variables, J, $\tilde{\tau}$ and $\omega$, must also be updated at the end of each iteration of the querying algorithm for use in the next. Their new values depend on the combination of their current values and the derived-key of the current-quadrant identified at the end of a binary search. The critical variables, once updated in the manner described by Butz, encapsulate the characteristics of the next-state corresponding to the derived-key of the current-quadrant in the current state.

4.2.4 Notes on the Source Code

The example software implementation, given at the end of this Section, is expressed iteratively but can quite easily be adapted to be implemented recursively. The implementation assumes that the order of curve used is the same as the number of binary digits (bits) that make up a variable of type 'unsigned int' in the ANSI 'C' programming language. The detail of the implementation can be adapted where other orders of curve are required or where an 'unsigned int' (or its equivalent in a different programming language) contains a different number of bits to the order of curve.

The calculation of the next-match (a derived-key) that is equal to or greater than a page-key (a derived-key) is invoked by calling the function 'H_nextmatch_RQ' that in turn calls the function 'HB_nextmatch_RQ'. The latter makes use of a supplementary function HB_matches_RQ that has the dual purpose of determining the n-point of the quadrant identified as the current-quadrant at the end of the binary search and also of determining the characteristics of the next-state for the next iteration of the algorithm. The next-state encapsulates the ordering of the quadrants within the current-quadrant at the next lower level of the tree representation of the Hilbert Curve. H_nextmatch_RQ returns a value of 0 if no next-match exists otherwise, the next-match is placed in the memory location pointed to by the next_match parameter.

The value DIM denotes the number of dimensions in the data space, hitherto referred to as n in this document.

Parameters passed to HB_nextmatch_RQ are as follows:

LoBound: the coordinates of the point at the lower bound of the query.

HiBound: the coordinates of the point at the upper bound of the query.

next_match: a pointer to a derived-key variable in which is placed the next-match, if found.

page_key: a pointer to a derived-key variable that contains the current-page-key.

K: a measure of the current level of the tree representation of the Hilbert Curve. Initially, at the root this is set to 'ORDER-1' (ORDER is defined in the source code). It is decremented in each iteration of the search as the tree is descended. It corresponds to the current-tree-level referred to in the algorithms described earlier.

xJ: one of the three variables encapsulating the current-state.

tT: one of the three variables encapsulating the current-state.

W: one of the three variables encapsulating the current-state.

LoMask: used with HiMask to determine whether the current-quadrant lies wholly within the query region. Both are initially 0.

The main local variables used are as follows (other working variables are described in or clear from their use in the source code):

H: the K-th order DIM bits taken from the page-key. In the first iteration of the algorithm it is the DIM most significant bits of the page-key. DIM designates the number of dimensions in the space.

qLo: an n-point; the K-th DIM bits from LoBound. Where K equals zero, this holds the least significant bits of the coordinates of the lower bound of the query region.

qHi: similar to qLo; the K-th DIM bits from HiBound.

L_xor_H: a DIM-bit value holding bit values of 1 where qLo and qHi have the same values in the same dimension eg, where DIM equals 2, values of 1 in both bits indicates the current-query-region lies wholly within the same quadrant.

Lo: initially, the lowest derived-key in a state or node; ie 0.

Hi: initially, the highest derived-key in a state or node; ie NUMPOINTS-1. (NUMPOINTS is defined in the source code).

region: the n-point of the current-quadrant whose derived-key is Lo; identified at the end of the binary search of a node or state. If the search for the next-match progresses to a lower level in the tree then region will define the new current-search-space.

LoHi_H: initially, the highest derived-key of a quadrant in the bottom half of a state. See also Section 4.2.3 of this description of the present invention.

HiLo_H: initially, the lowest derived-key of a quadrant in the top half of a state.

LoHi_C: the n-point corresponding to LoHi_H.

partitioning_dimension: the dimension in which the points in the bottom half (or part) of a state differ from the points in the top half. See also Section 4.2.3 of this description of the present invention.

R_xor_L: a DIM-bit value holding values of 1 for dimensions in which the n-point of the quadrant containing the (tentative) next-match has a higher value than the query lower bound (qLo), enabling lower bits in the query lower bound to be set to values of 0. This enables the current-query-region to be restricted to that part that intersects with the current-quadrant to be used in the next iteration of the algorithm.

R_xor_H: a DIM-bit value holding values of 1 for dimensions in which the n-point of the quadrant containing the (tentative) next-match has a lower value than the query upper bound (qHi), enabling lower bits in the query upper bound to be set to values of 1. This enables the current-query-region to be restricted to that part that intersects with the current-quadrant to be used in the next iteration of the algorithm.

The example source code must be compiled using a 32-bit compiler for the ANSI 'C' programming language and that defines unsigned integers as being 32-bit words. The inventor successfully compiled the source code using the 'cc' compiler supplied with the Sun Solaris 5.7 operating system.

```
#define DIM <specified as the number of dimensions in the space>
#define ORDER 32 /* the order of the curve */
/* assumes the variable type 'unsigned int' is a 32-bit word;
   ie contains 'ORDER' bits */
typedef unsigned int U_int;
typedef struct {U_int hcode[DIM];}Hcode;
typedef Hcode Point;
int NUMPOINTS = 1 << DIM;
U_int g_all_ones = (1 << DIM)-1 ;
static int HB_matches_RQ (U_int P, U_int Lo, U_int L_xor_H,
                          U_int *A, U_int *xJ, U_int *tT, U_int *W){
    U_int    J, S, tS, T, local_W = *W, temp1, temp2; int j;
    S = P ^ P / 2;
```

```
            if (*xJ % DIM != 0){
                temp1 = S >> *xJ % DIM;   temp2 = S << DIM - *xJ % DIM;
                tS = temp1 | temp2;        tS &= ((U_int)1 << DIM) - 1;
            }
            else tS = S;
            local_W ^ = *tT;
            *A = local_W ^ tS;
            if ((*A & L_xor_H) == (Lo & L_xor_H)){
                *W = local_W;
                if (P < 3) T = 0;
                else
                    if (P % 2)
                        T = (P - 1) ^ (P - 1) / 2;
                    else
                        T = (P - 2) ^ (P - 2) / 2;
                if (*xJ % DIM != 0){
                    temp1 = T >> *xJ % DIM;   temp2 = T << DIM - *xJ % DIM;
                    *tT = temp1 | temp2;       *tT &= ((U_int)1 << DIM) - 1;
                }
                else *tT = T;
                J = DIM;
                for (j = 1; j < DIM; j++)
                    if ((P >> j & 1) == (P & 1)) continue;
                    else break;
                if (j != DIM) J -= j;
                *xJ += J - 1;
                return 1;
            }
        return 0;
    }
    static U_int HB_nextmatch_RQ (Point LoBound, Point HiBound,
            Hcode *next_match, Hcode *page_key, int K,
            U_int xJ, U_int tT, U_int W, U_int LoMask, U_int HiMask)
    {
        U_int   mask, qLo, qHi, L_xor_H, R_xor_L, R_xor_H, region,
                H, element, temp, partioning_dimension,
                Lo, Hi, LoHi_H, HiLo_H, LoHi_C, tSL, tSH, temp1, temp2, i;
        int     j, N;
    /* variables used for 'saving' current values of variables
      in case back-tracking is required */
        U_int   qLoBAK, qHiBAK, L_xor_HBAK, HBAK, xJBAK, tTBAK, WBAK,
                LoMaskBAK, HiMaskBAK, LoBAK, HiBAK, Backup = FALSE;
        Hcode   next_matchBAK;
        Point   LoBoundBAK, HiBoundBAK;
        int     KBAK;
        while (K >= 0) {
            mask = 1 << K;
    /* step 1: find the n-points of the quadrants in which the
      query lower and upper bound points lie */
            for (i = qLo = qHi = 0; i < DIM; i++) {
                if (LoBound.hcode[i] & mask) qLo |= 1 << (DIM-1-i);
                if (HiBound.hcode[i] & mask) qHi |= 1 << (DIM-1-i);
            }
    /* step 2: extract DIM consecutive bits from page_key */
            element = (DIM * K) / ORDER;
            H = page_key->hcode[element];
            if ((DIM * K) % ORDER > ORDER - DIM){
                temp = page_key->hcode[element + 1];
                H >>= (DIM * K) % ORDER;
                temp <<= ORDER - (DIM * K) % ORDER; H |= temp;
            }
            else H >>= (DIM * K) % ORDER;
            if (DIM < ORDER) H &= (1 << DIM) -1;
    /* step 3: find in which dimensions the query lower and upper
      bounds have the same values */
            L_xor_H = qLo ^ qHi; L_xor_H = ~L_xor_H;
    /* step 4: do a binary search of the derived-keys of the quadrants
      in the current-state to find the quadrant with the lowest
      derived-key that is greater than or equal to the value of H and
      which is within the query range SEE ALGORITHM 3 (FIG.10C) */
            for (Lo = 0, Hi = NUMPOINTS - 1 ; Lo != Hi ; ){
    /* the middle 2 ordered derived-keys of quadrants in a state or
      part of a state. They enable us to divide it in 2; one is the
      upper bound of the lower part and the other is the lower
      bound of the upper part */
                LoHi_H = Lo + (Hi - Lo) / 2; HiLo_H = LoHi_H + 1;
    /* find the partitioning-dimension */
                tSL = LoHi_H ^ LoHi_H / 2; tSH = HiLo_H ^ HiLo_H / 2;
                if (xJ % DIM != 0){
```

```
/* right circular shift tSL and tSH by xJ bits */
                temp1 = tSL >> xJ % DIM; temp2 = tSL << DIM - xJ % DIM;
                tSL  = temp1 | temp2; tSL &= ((U_int)1 << DIM) - 1;
                temp1 = tSH >> xJ % DIM; temp2 = tSH << DIM - xJ % DIM;
                tSH  = temp1 | temp2; tSH &= ((U_int)1 << DIM) - 1;
            }
/* the dimension in which all points in the lower half of the
   state (or part) have the same value and the points in the
   upper half have the opposite value */
                partioning_dimension = tSL ^ tSH;
/* The n-point of the quadrant with the highest derived-key in
   the 'lower' half of the state (or part) */
                LoHi_C = W ^ tT ^ tSL;
/* check to see if the query intersects with the lower half of
   the state (or part) i.e. if its lower bound is within it (the
   first test checks whether the query intersects both halves -
   both parts of the test are needed. NB 'partioning_dimension'
   and 'LoHi_C' change as the loop iterates) */
                if (!(partioning_dimension & L_xor_H) ||
                    ((partioning_dimension & LoHi_C) ==
                     (partioning_dimension & qLo))){
/* there is a match in the lower half of the state; either the range
   spans both halves (so far as the partioning_dimension
   dimension is concerned) or LoHi_C is within the range. . . */
/* check to see if H is in the lower half of the state (or part) */
                    if (LoHi_H >= H){
/* H is in the lower half of the state (or part). If the query
   spans both halves of the state (or part), record the limits
   of the top half of the state and note that search may continue
   there by assigning 'TRUE' to 'Backup'. If a next-match is not
   subsequently found in the lower half of the state the search
   may in the upper half (this is back-tracking) */
                        if (!(partioning_dimension & L_xor_H)){
                            qLoBAK = qLo; qHiBAK = qHi;
                            L_xor_HBAK = L_xor_H; HBAK = H;
                            xJBAK = xJ; tTBAK = tT; WBAK = W; KBAK = K;
                            next_matchBAK = *next_match;
                            LoBoundBAK = LoBound; HiBoundBAK = HiBound;
                            LoMaskBAK = LoMask; HiMaskBAK = HiMask;
                            LoBAK = HiLo_H; HiBAK = Hi; Backup = TRUE;
                        }
/* set (reduce) the 'Hi' value for the next iteration of the
   binary search */
                        Hi = LoHi_H;
                    }
                    else
/* . . .but H is in the upper half of the state (or part),
   therefore check if the range also intersects with the upper
   half. . .if so, set (increase) the 'Lo' value for the next
   iteration of the binary search */
                        if (!(partioning_dimension & L_xor_H))
                            Lo = HiLo_H;
                        else
/*. . .otherwise H is in the upper half of the state (or part) but
   the query doesn't intersect with it; therefore, if we
   previously found a (larger) half state (or part) with which
   the query intersects, backtrack to it, restoring the values of
   working variables accordingly */
                            if (Backup){
                                qLo = qLoBAK; qHi = qHiBAK;
                                L_xor_H = L_xor_HBAK; H = HBAK;
                                xJ = xJBAK; tT = tTBAK; W = WBAK; K = KBAK;
                                *next_match = next_matchBAK;
                                LoBound = LoBoundBAK; HiBound = HiBoundBAK;
                                LoMask = LoMaskBAK; HiMask = HiMaskBAK;
                                Lo = LoBAK; Hi = HiBAK; Backup = FALSE;
                            }
                            else return 0; /* no next_match exists */
                }
                else
/* the query region does not intersect with the upper half of
   the state (or part), therefore set (increase) the value of
   'Lo' for the next iteration of the binary search */
                    Lo = HiLo_H;
            } /* end of binary search */
/* determine the characteristics of the next-state for the quadrant
   whose derived-key is 'Lo' (using variables xJ, tT and W).
   'region' is set to be the n-point corresponding to the quadrant
   whose derived-key is 'Lo'. */
```

```
                if (!HB_matches_RQ(Lo, qLo L_xor_H, &region, &xJ, &tT, &W))
                    exit(1); /* an error has occurred */
                if (K > 0){
/* restrict the query region (LoBound and HiBound) to that part
  which intersects the region containing the next-match, if it
  exists, i.e. 'Lo'. 'R_xor_L' has bits set to 1 if 'region'
  and 'qlo' have different values in the corresponding
  dimensions. Since 'region' is within the query range, its
  bits will be 1 and qLo's will be 0 therefore in restricting
  the query range, we increase the value of the current order's
  bit in the query to 1 and set the lower bits to 0. Since at
  higher orders we are only going to encounter 0 bits in qLo
  values, it's simplest to set the whole value of the query
  lower bound to 0. A similar logic applies to 'R_xor_H' if the
  query region was wholly within the subspace which is defined
  by 'region' then both 'R_xor_L' and 'R_xor_H' would be 0 in
  all bits and the query region would not get changed */
                    for (R_xor_L = region ^ qLo, N = DIM - 1;
                            R_xor_L; R_xor_L >>= 1, N--)
                        if (R_xor_L & 1){
                            LoBound.hcode[N] = 0; LoMask |= 1 << (DIM-1-N);
                        }
                    for (R_xor_H = region ^ qHi, N = DIM - 1;
                            R_xor_H; R_xor_H >>= 1, N--)
                        if (R_xor_H & 1) {
                            HiBound.hcode[N] = U_int_MAX;
                            HiMask |= 1 << (DIM-1-N);
                        }
                }
                if (Lo == H)
                    if (LoMask == g_all_ones && HiMask == g_all_ones) {
                        *next_match = *page_key;
                        return 2; /* the next-match has been found */
                    }
/* step 6: add in DIM bits of the current-quadrant's
  derived-key into the next-match */
                element = (DIM * K) / ORDER;
                if ((DIM * K) % ORDER > ORDER - DIM){
                    next_match->hcode[element] |= Lo << (DIM * K) % ORDER;
                    next_match->hcode[element + 1] |=
                        Lo >> ORDER - (DIM * K) % ORDER;
                }
                else
                    next_match->hcode[element] |=
                                Lo << (DIM * K) - element * ORDER;
                K--;
                if (Lo > H) break; /* search can be completed more simply */
            } /* end of while loop */
            if ( K < 0 )
                return 1; /* the next-match has been found */
/* SEE ALGORITHM 2 (FIG.10B) */
            for (j = K; j > 0; j--){
/* at his stage, we are no longer interseted in the value of bits in
  the page-key; a next-match is guaranteed to exist - all that is
  needed now is to find the lowest derived-key in the
  current query region. */
                if (LoMask == g_all_ones && HiMask == g_all_ones)
                    return 1; /* the next-match has been found */
                mask = 1 << j;
                for (i = qLo = qHi = 0; i < DIM; i++){
                    if (LoBound.hcode[i] & mask) qLo |= 1 << (DIM-1-i);
                    if (HiBound.hcode[i] & mask) qHi |= 1 << (DIM-1-i);
                }
                L_xor_H = qLo ^ qHi; L_xor_H = ¯L_xor_H;
                for (Lo = 0, Hi = NUMPOINTS - 1; Lo != Hi ; ){
                    LoHi_H = Lo + (Hi - Lo) / 2; HiLo_H = LoHi_H + 1;
                    tSL = LoHi_H ^ LoHi_H / 2; tSH = HiLo_H ^ HiLo_H / 2;
                    if (xJ % DIM != 0){
                        temp1 = tSL >> xJ % DIM; temp2 = tSL << DIM - xJ % DIM;
                        tSL   = temp1 | temp2; tSL &= ((U_int)1 << DIM) - 1;
                        temp1 = tSH >> xJ % DIM; temp2 = tSH << DIM - xJ % DIM;
                        tSH   = temp1 | temp2; tSH &= ((U_int)1 << DIM) - 1;
                    }
```

```
            partioning_dimension = tSL ^ tSH;
            LoHi_C = W ^ tT ^ tSL;
            if (!(partioning_dimension & L_xor_H) ||
                ((partioning_dimension & LoHi_C) ==
                (partioning_dimension & qLo)))
                Hi = LoHi_H;
            else Lo = HiLo_H;
        }
        if (!HB_matches_RQ (Lo, qLo, L_xor_H, &region, &xJ, &tT, &W))
            exit(1); /* an error has occurred */
        if (j > 0){
            for (R_xor_L = region ^ qLo, N = DIM - 1; R_xor_L;
                    R_xor_L >>= 1, N--)
                if (R_xor_L & 1){
                    LoBound.hcode[N] = 0; LoMask |= 1 << (DIM-1-N);
                }
            for (R_xor_H = region ^ qHi, N = DIM - 1; R_xor_H;
                    R_xor_H >>= 1, N--)
                if (R_xor_H & 1){
                    HiBound.hcode[N] = U_int_MAX;
                    HiMask |= 1 << (DIM-1-N);
                }
        }
        element = (DIM * j) / ORDER;
        if ((DIM * j) % ORDER > ORDER - DIM)
        {
            next_match->hcode[element] |= Lo << (DIM * j) % ORDER;
            next_match->hcode[element+1] |=
                                Lo >> ORDER - (DIM * j) % ORDER;
        }
        else
            next_match->hcode[element] |=
                                Lo << (DIM * j) - element * ORDER;
    }
    return 1; /* the next-match has been found */
}
U_int H_nextmatch_RQ (Point LoBound, Point HiBound,
        Hcode *next_match, Hcode *page_key){
    /* the 6-th to 8-th parameters are xJ, tT and W */
    return HB_nextmatch_RQ (LoBound, HiBound, next_match,
                        page_key, ORDER - 1, 0, 0, 0, 0, 0);
}
```

5 Preferred Method of Use of the Invention

This Section describes the preferred method of use of the invention.

It is preferred that the order of curve used in the mapping is the same as the number of bits used by the unsigned integer data type supported by the computer programming language and its compiler used in the software implementation and that the smallest possible data type be used that can accommodate all values of any attribute domain of the multi-dimensional data. That is, the smallest practicable order of curve should be used, for reasons of computational efficiency. This is amplified further above in Section 1.

It is preferred that mapping calculations between n-dimensional values and one-dimensional values are carried out with the aid of state diagrams held in the volatile, or 'main', memory of the computer where the number of dimensions in the space, or the number of attributes of the multi-dimensional data, is less than or equal to 8 dimensions. Where a larger number of dimensions is required, mappings should be carried out by calculation without the aid of state diagrams. Use of state diagrams in 8 dimensions or less maximises the computational efficiency of the application, given the prior art in computer hardware technology.

Although any one-dimensional data structure may be used for the purposes of indexing, use of the B*-Tree is preferred since it is a simple, compact and well understood data structure. It is also preferred that the method of utilizing the storage capacity of pages of data is based on the design of this data structure in order for the database to be as compact as possible.

Although data pages need not be fixed-sized, it is preferred that they are as this simplifies the implementation and should be adequate for general purpose use of the invention.

It is preferred that the orientation of the Hilbert Curve used in the mapping is the same as that used in the description and examples in this document. There is no apparent benefit of choosing one orientation over another. Usage of the preferred orientation allows mapping and querying algorithms given in the aforementioned Technical Reports BBKCS-00-01 and BBKCS-00-02 and in the PhD thesis of the inventor to be used. These algorithms have been implemented and thoroughly tested for correctness of operation by the inventor.

How records of data are organized, ordered and represented on pages of storage is independent of the present invention. The detail of this aspect of the implementation of the invention needs only to allow for the redistribution of data between pages as they become full or when the number of datum-points stored on a page falls below a predetermined threshold.

Choice of the data capacity of a page of data is independent of the present invention but, for reasons of efficiency of operation, should ideally be a multiple of the size of the unit of transfer of data between secondary storage and main memory that is determined by the computer hardware on which the software is run and the characteristics of the computer operating system. The optimum capacity is likely to be influenced by the number of dimensions of the multi-dimensional data, the volume of data and how the database is used in terms of volume of updates and querying. The optimum capacity is likely to be chosen following practical experimentation.

The results of practical experimentation by the inventor suggest that whether the calculate_next_match algorithm is implemented iteratively or recursively is of little importance. A recursive implementation is, however, less difficult to effect, particularly in the case where calculation is used without the aid of state diagrams.

5.1 An Example of the Querying Algorithm

FIGS. 12A–12F illustrate an example of the operation of the calculate_next_match function described above and illustrated in FIGS. 10A–10C.

Figure 3:
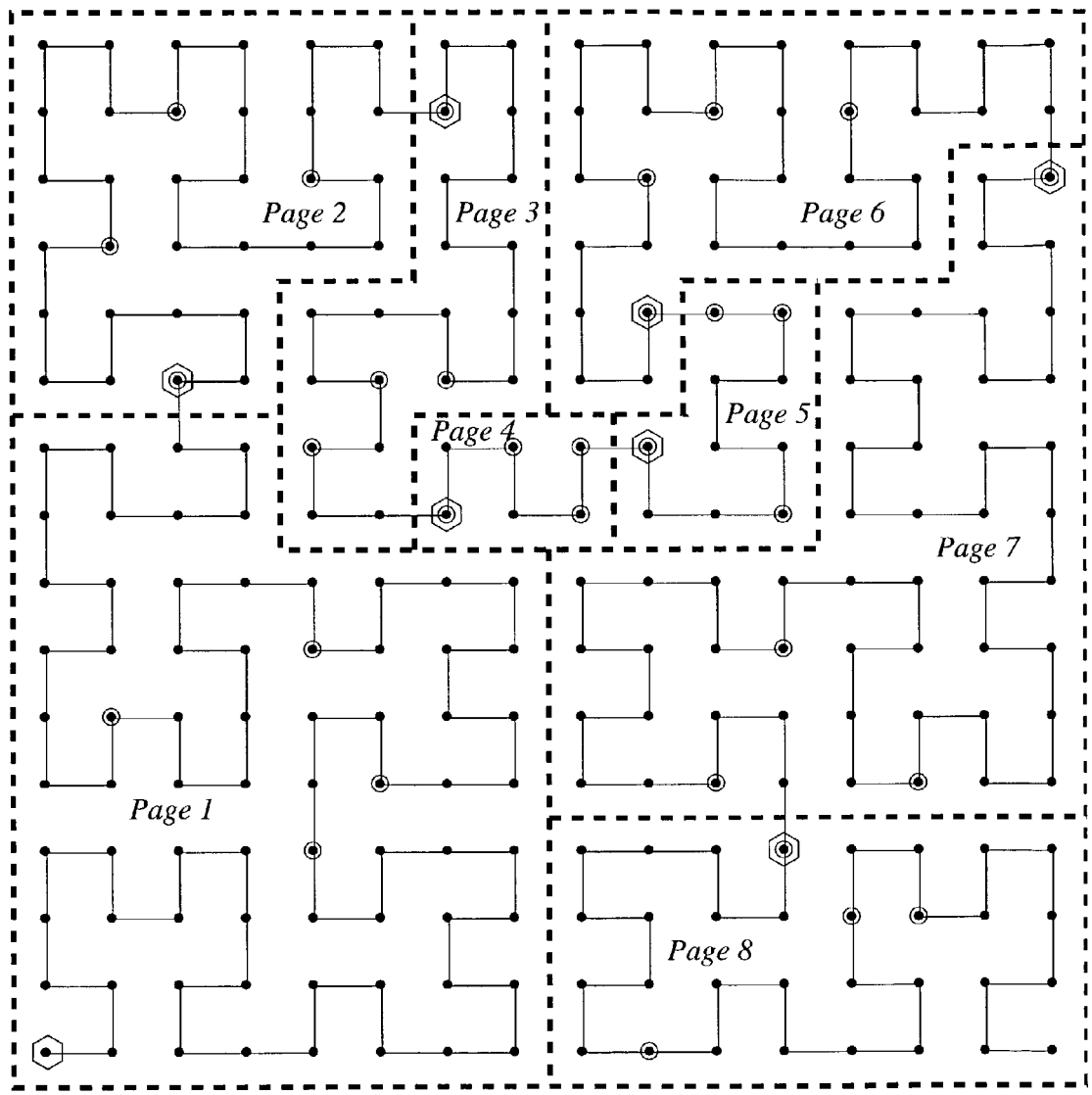
Figure 4:
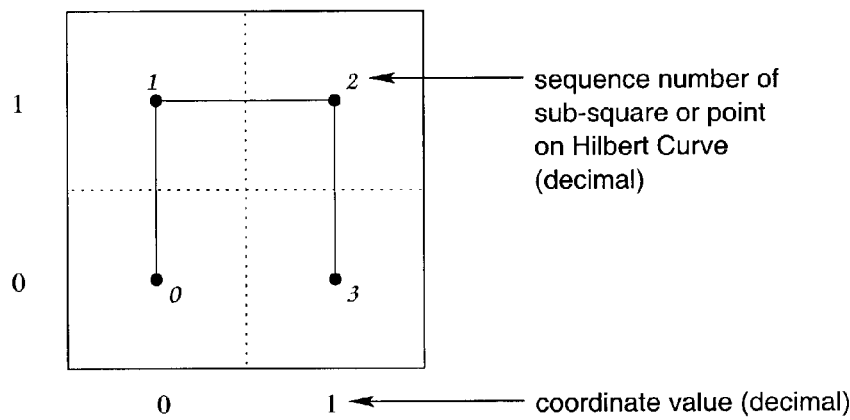
Figure 5:
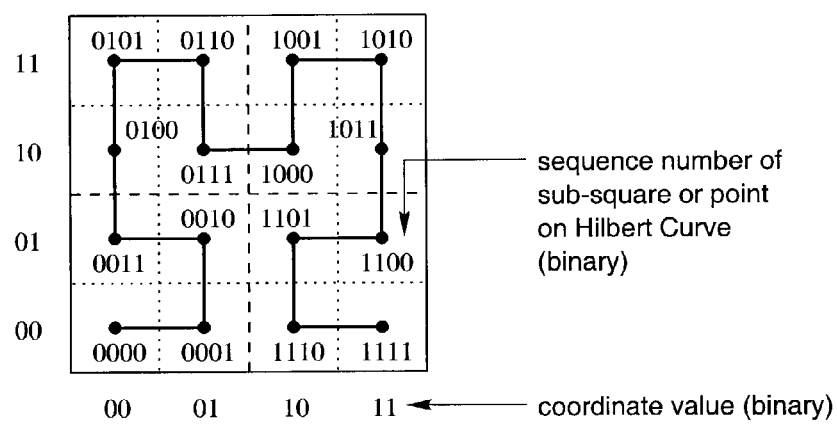
Figure 6:
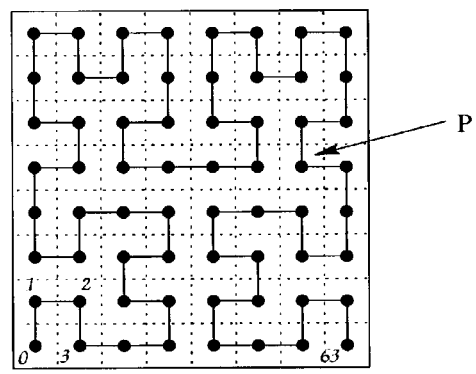
Figure 7:
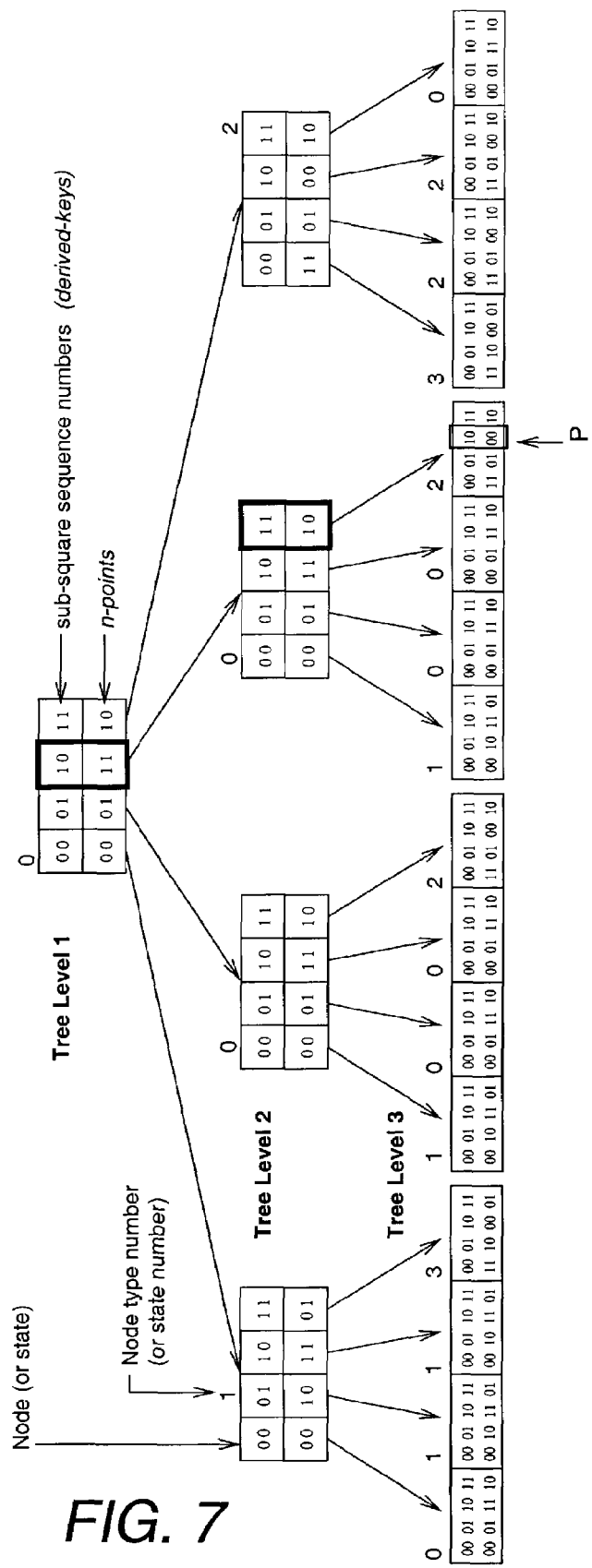
Figure 8:
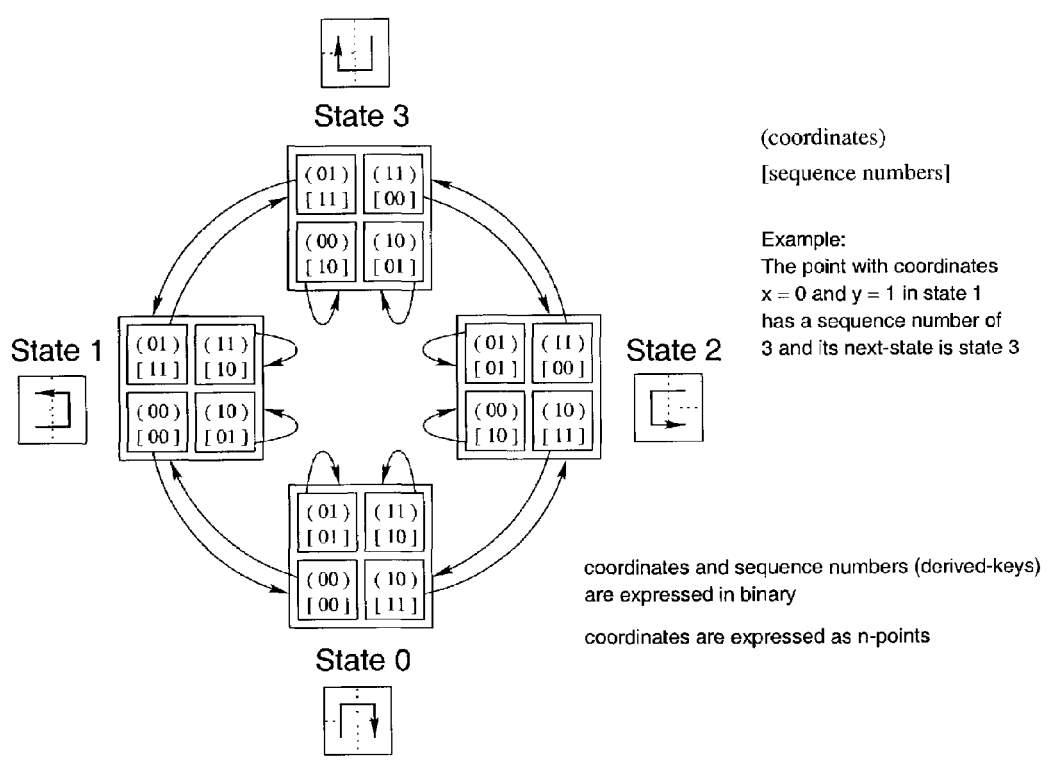
Figure 9:
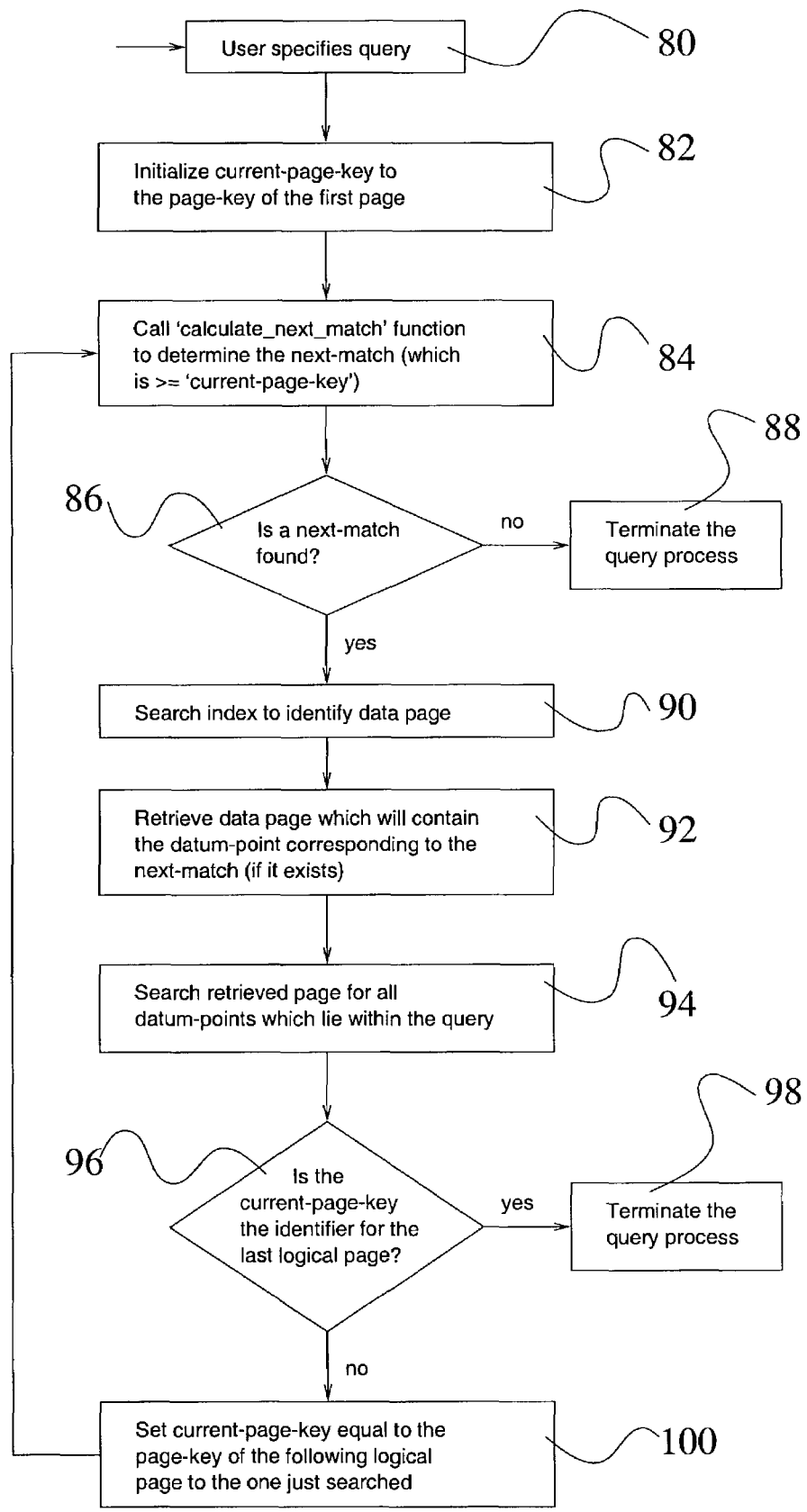
Figure 11:
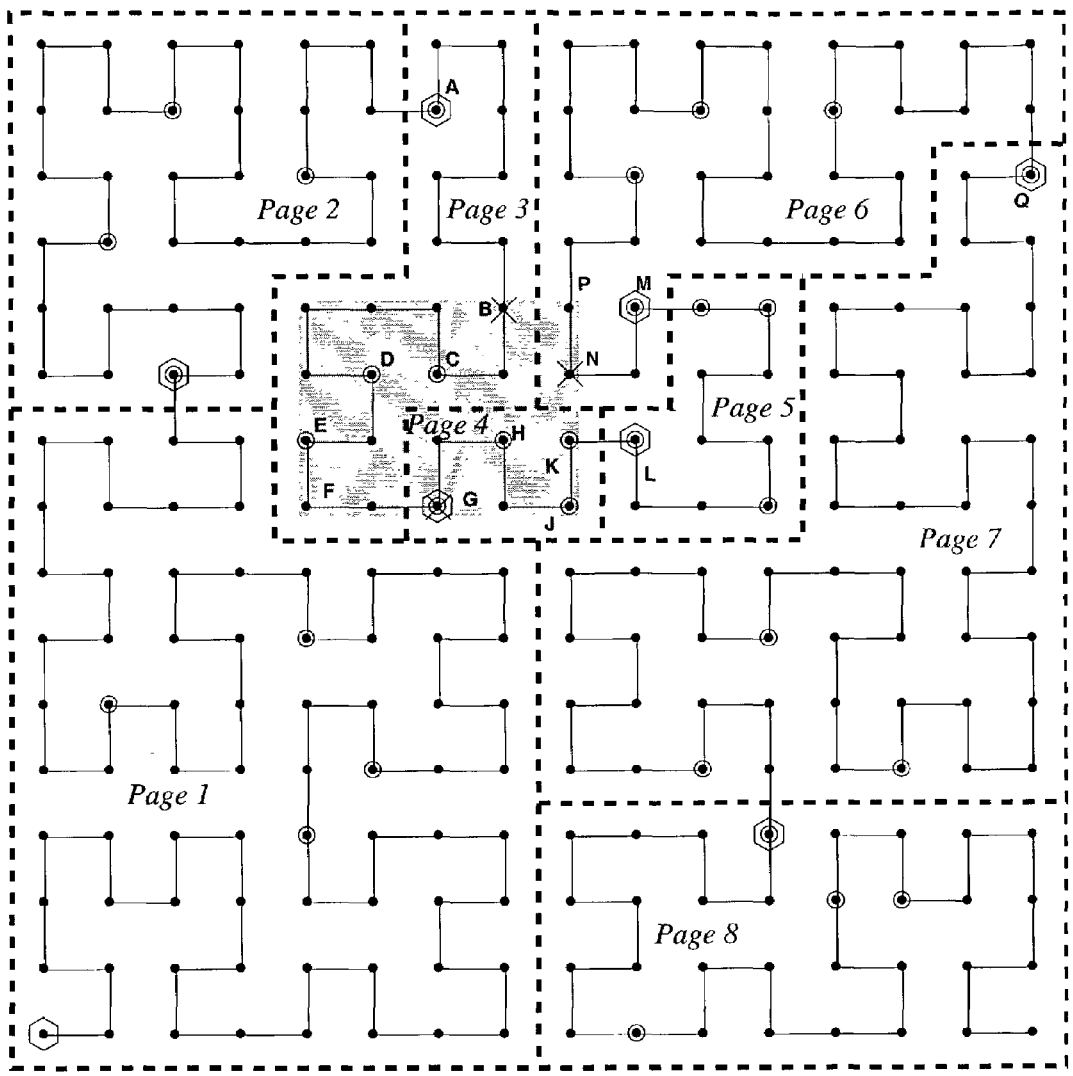
FIG. 11 shows the example 2 dimensional database given in FIG. 3 overlain by an example range query shown as a shaded rectangle.
Figure 12A:
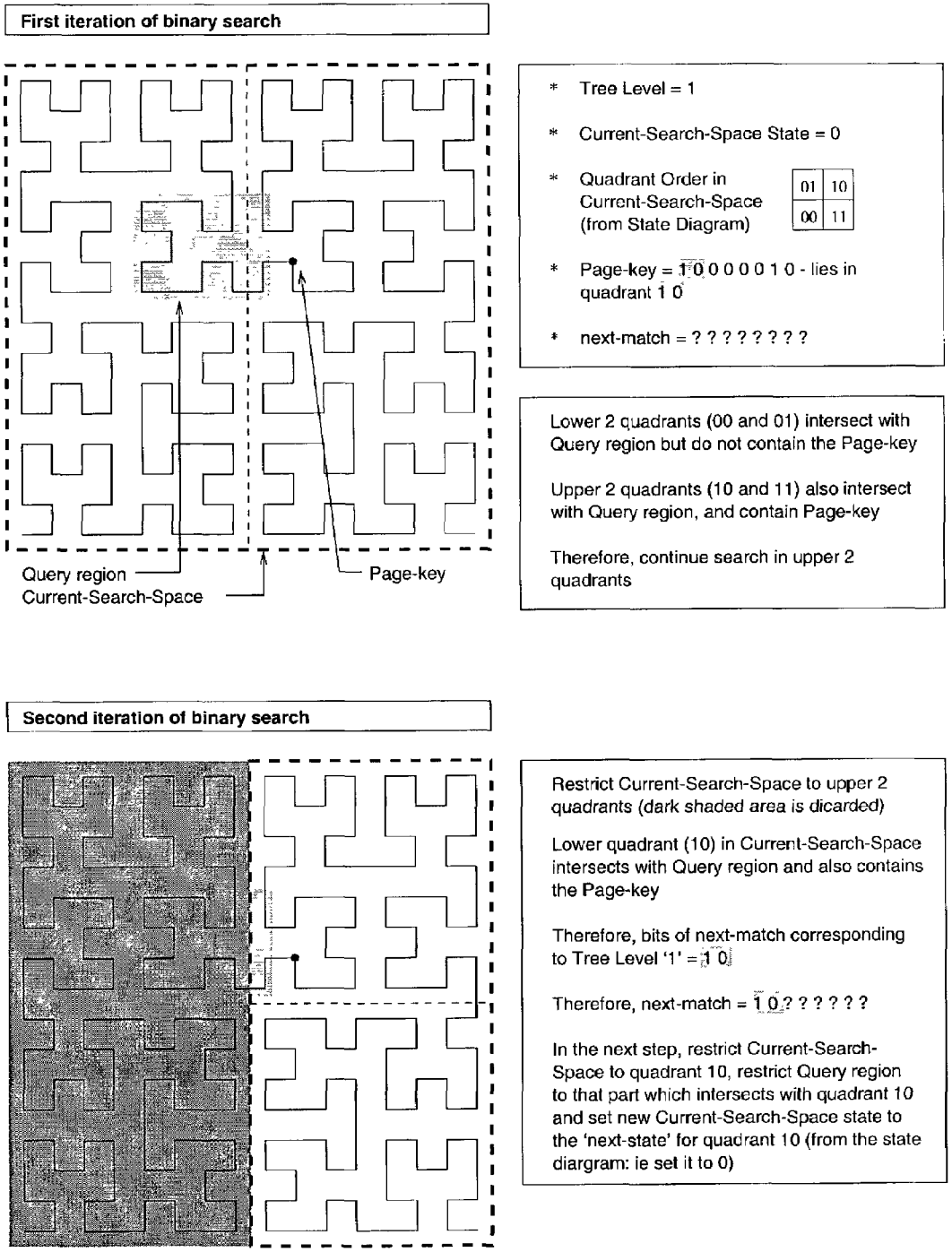
Figure 12B:
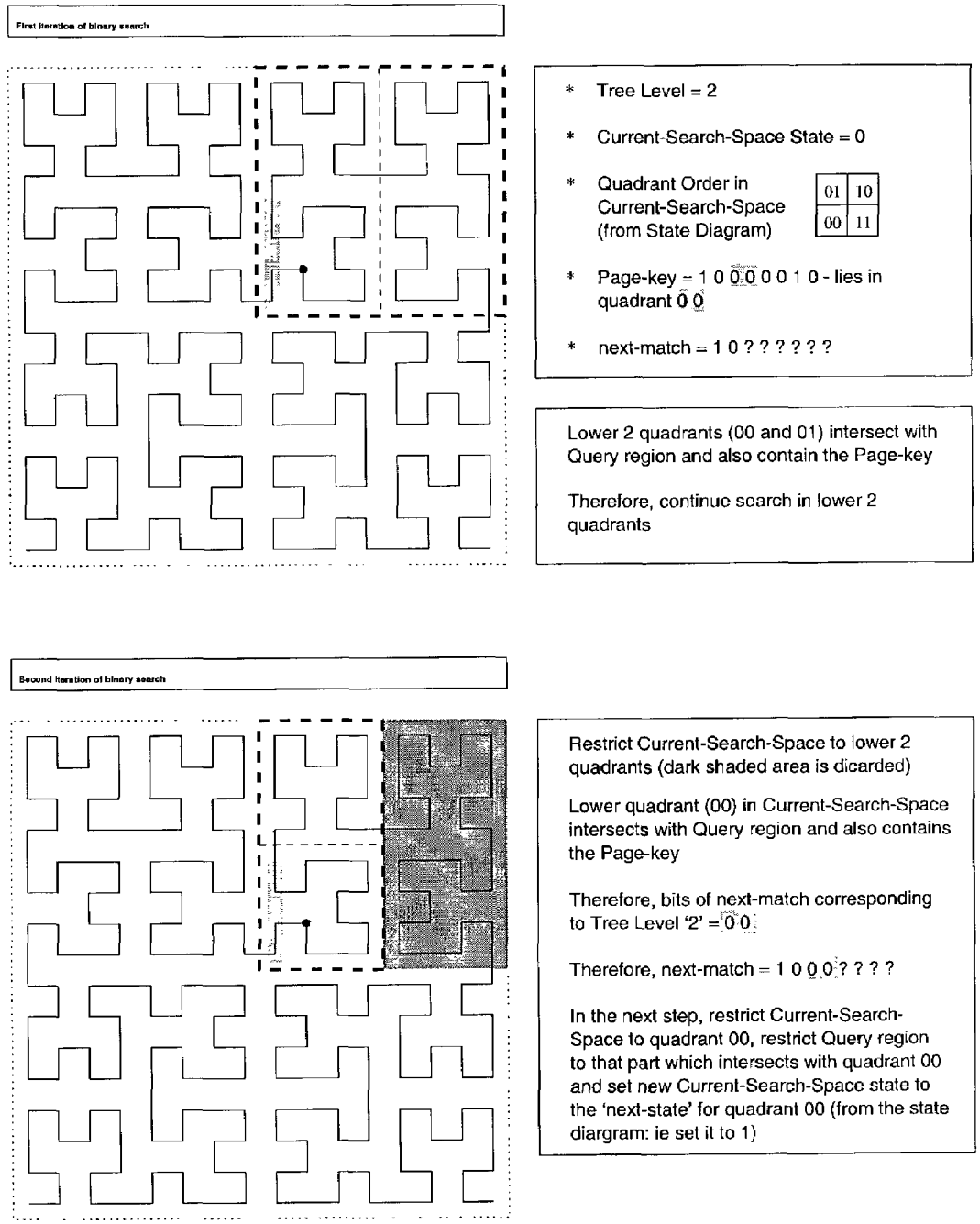
Figure 12D:
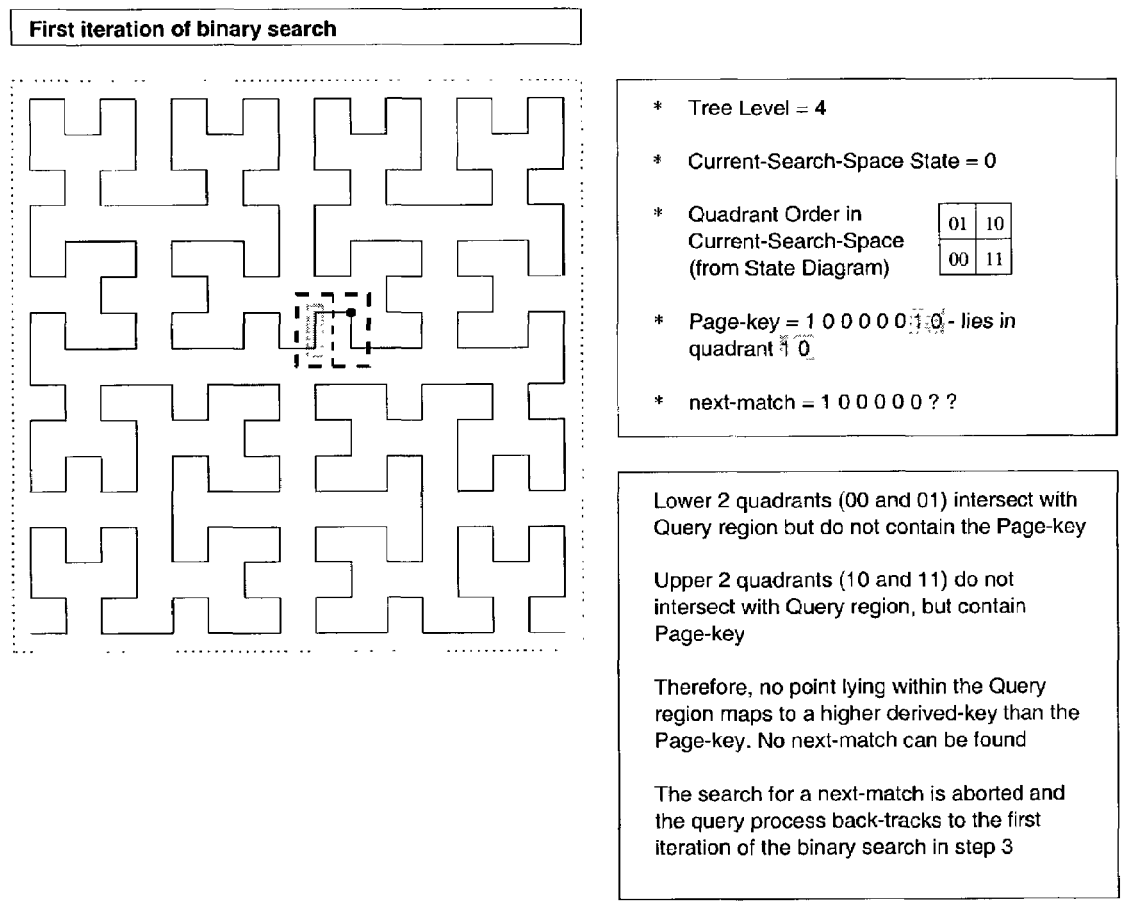
Figure 12E:
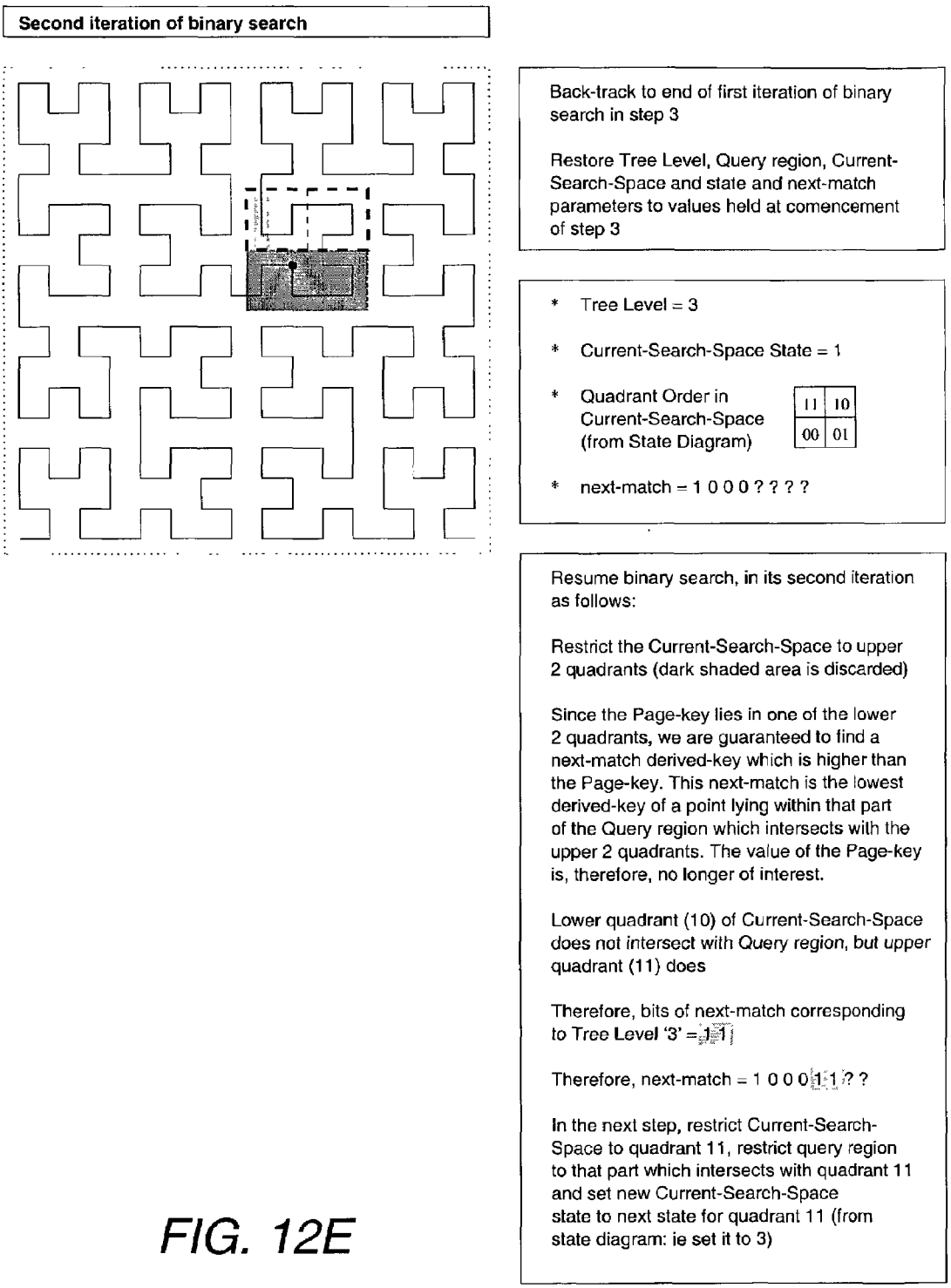

The example shows how to calculate the next-match that is greater than the derived-key of a point lying outside of the query region and where the latter is greater than the previously calculated next-match. In relation to FIG. 11, it shows how to calculate the derived-key of point N when the current-page-key is known to be the derived-key of point L. This example also illustrates how the search for the next-match can require a number of iterations that is greater than the order of the curve or height of the tree conceptual view of the Hilbert Curve. This occurs when an initially chosen search path fails to lead to the next-match and back-tracking is required to a higher and previously visited level of the tree prior to a second descent along an alternative path.

Figure 14:
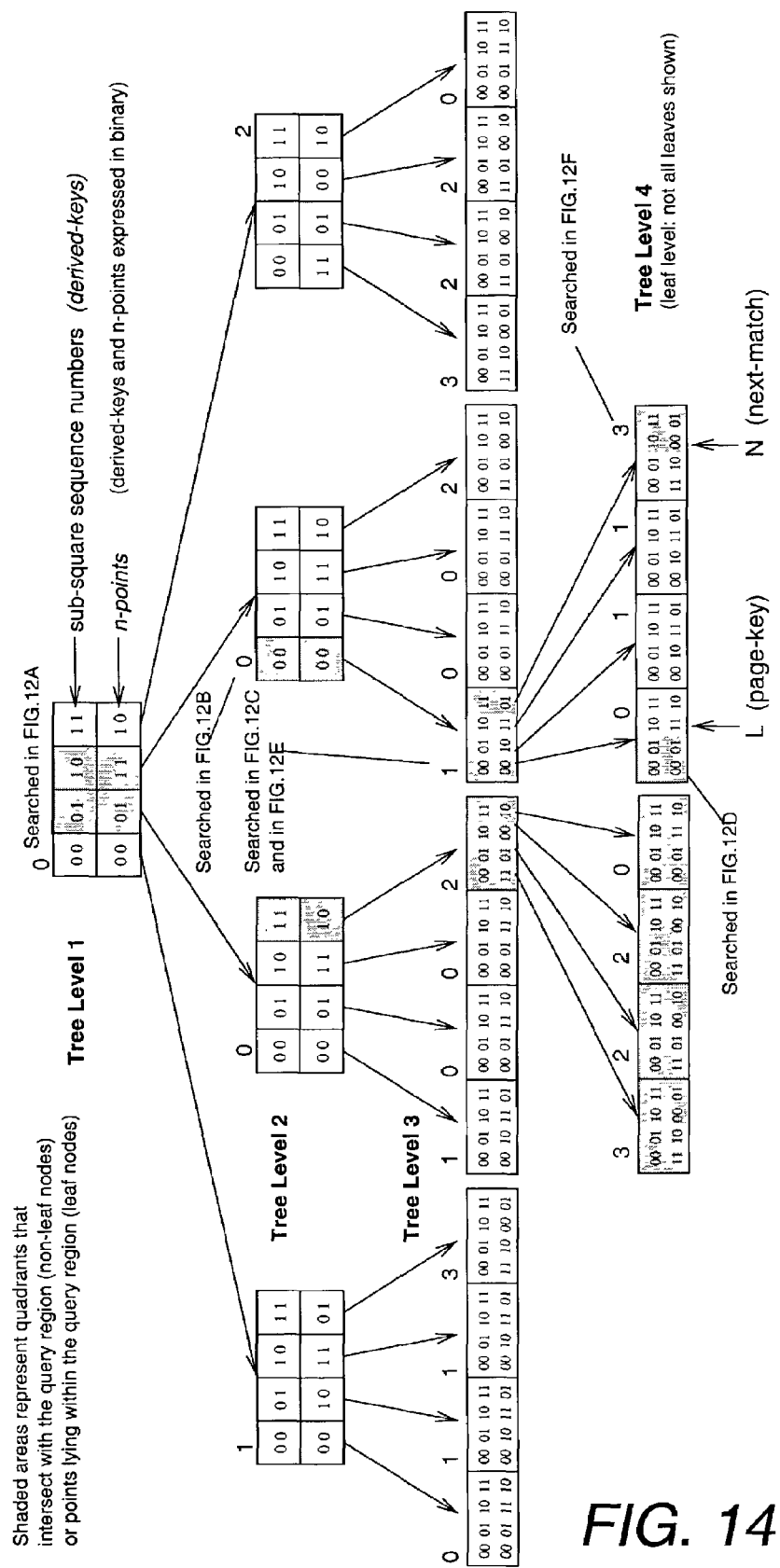

FIG. 14 shows how the tree representation of the Hilbert Curve is traversed during the execution of the example query.

FIG. 13 shows examples of how to determine which hyper-rectangular sub-spaces intersect with a query region in 2 dimensions.

Description and Operation—Alternative Embodiments

The querying strategy already described in assumes that each page of data is indexed using the page-key that is the lowest derived-keys of any datum-point placed on it.

Where the page-key is the highest derived-key of any datum-point placed on it, current-page-key used in the algorithm is taken to be zero for the first time that the calculate_next_match function. In subsequent calls to the function, the current-page-key is taken to be the page-key of the page just searched plus one.

Where a pair of page-keys is used to index pages, once the next-match has been calculated by the calculate_next_match function, the index is searched and if the next-match is not found to lie between any page-key pair, the function is called again. The next time the function is called, it is passed the lowest page-key of a pair found in the index which is greater than or equal to the next-match as its page-key, or current-page-key, parameter.

The algorithm for the calculate_next_match function already described assumes an embodiment of the Hilbert Curve as defined by using either the state diagram method for mapping between n-dimensional and one-dimensional values described in the aforementioned Technical Report BBKCS-00-02 and the PhD thesis of the inventor or by using the calculation method described in the aforementioned Technical Report BBKCS-00-01 and the PhD thesis of the inventor.

An implementation of the calculate_next_match function that uses state diagrams can be used with any state diagram. A state diagram that defines one embodiment of the Hilbert Curve can simply be replaced by another state diagram that defines another embodiment.

Where mapping is carried out without the aid of state diagrams, the algorithm for calculating the next-match can be implemented in a similar manner to that already described. That is, those parts of the implementation which pertain to mapping or partial mapping calculations and the definition of the current-state and next-state need to be adapted to suit the particular mapping method used.

Conclusion, Ramifications and Scope

The present invention includes the first algorithm devised to facilitate the querying of multi-dimensional data indexed using the Hilbert Curve. Thus for the first time it makes the utilization of the Hilbert Curve viable and so enables it to be practicably and usefully exploited to efficiently organise multi-dimensional data using a simple and compact yet flexible indexing method.

The indexing method when used with the querying algorithm effectively simulates the provision of all possible secondary indexes for multi-dimensional data without actually requiring them and which would not be practicable.

The partitioning strategy is simple and can be applied automatically without the intervention of a domain expert.

The querying algorithm facilitates the lazy retrieval of data in response to a query.

The partitioning method achieves a guaranteed high data page storage utilization.

The data store adapts well on update through insertion and deletion of data objects.

The index remains compact, typically its size is less than about 2 percent of the size of the data store itself.

While the above description contains many specificities, these should not be construed as limitations on the scope of the present invention, but rather as an exemplification of one preferred embodiment thereof. Many other variations are possible, as discussed below.

The querying algorithm can generally be stated as enabling the calculation of the lowest sequence number of a point lying on the Hilbert Curve and also lying within a rectangle in multi-dimensional space which is greater than or equal to the sequence number of some other arbitrary point in multi-dimensional space. As such, its application is not restricted to data storage and retrieval application.

The order in which the Hilbert Curve passes through points in multi-dimensional space can be determined differently by different mapping algorithms and any such algorithm is suitable in the data storage and retrieval application described here. Thus the Hilbert Curve is a concept that can be defined in more ways than one.

Similarly, any orientation of the Hilbert Curve, as defined by which 'corners' of multi-dimensional space it begins and ends in, can be applied in the application.

The application and examples described refer to the 'C' Programming language but any general purpose programming language may be used to implement the application.

Reference has been made to the B+ tree as a method of constructing the index but in practice any one dimensional indexing method can be utilized.

The present invention as described assumes fixed sized pages of storage but this is not a requirement. The implementation can equally support variable page sizes.

The present invention as described above regards pages of storage as corresponding to contiguous lengths of Hilbert Curve, some of the points on which correspond to data objects. In the preferred embodiment, the point with the lowest Hilbert Curve sequence number on a curve section is used as the index reference to the page. In an alternative embodiment, the highest sequence number of a point on a page's curve section can be used as the index reference. Alternatively, a page may be indexed using a pair of Hilbert Curve sequence numbers, one being the lowest sequence number of a data object stored on the page and the other being the highest sequence number of a data object stored on the page. In such an embodiment, successive pages in the data store correspond to sections of curve which are not contiguous. Between a pair of successive pages exist curve sections on which no actual data objects lie. This embodiment may assist in minimizing the number of pages which need to be searched in the complete execution of a query. If either or both of the data objects with the lowest and highest sequence numbers are subsequently deleted, the page's index entry may or may not be updated, depending on the detail of the implementation.

Accordingly, the scope of the present invention should be determined not by the embodiments illustrated, but by the appended claims and their legal equivalents.

I claim:

1. A method of storing multi-dimensional data or multi-dimensional data points, in a multi-dimensional database and retrieving subsets of said multi-dimensional data according to the specification of a query comprising:
  1 providing a computer memory which is able to store said multi-dimensional data at a series of addresses in said memory,
  2 providing a means of transforming by calculation of multi-dimensional points including said multi-dimensional data into one-dimensional values by mapping said multi-dimensional data to one-dimensional distance values along an approximation of a Hilbert space-filling curve that passes through all multi-dimensional points corresponding to possible data values in the domain of said multi-dimensional database,
  3 providing a means of partitioning said multi-dimensional data into an ordered sequence of subsets of said multi-dimensional data so that each said subset of said multi-dimensional data comprises multi-dimensional data that maps to lower said one-dimensional distance values than all succeeding said subsets of said multi-dimensional data,
  4 providing a means of identifying each said subset of said multi-dimensional data together with the location in said computer memory in which each said subset of multi-dimensional data is stored,
  5 providing a means of indexing locations in said computer memory of said subsets of said multi-dimensional data,
  6 providing a means of specifying a query region or query as a multi-dimensional rectangular region within said domain of said database,
  7 providing a calculation method utilizing bit-wise manipulation of said one-dimensional distance values along an approximation of a Hilbert space-filling curve for identifying for retrieval and searching which said subsets of said multi-dimensional data intersect with any said query, the calculation method comprising the steps of:
    (a) calculating the lowest said one-dimensional value corresponding to a multi-dimensional point lying within said query region and identifying from said index which subset of said multi-dimensional data will contain said multi-dimensional point, if it exists as a multi-dimensional data point in said database, and identifying from said index the location in said computer memory of said subset of said multi-dimensional data,
    (b) calculating the lowest one-dimensional value, if it exists, corresponding to a multi-dimensional point lying within said query region which is greater than or equal to the lowest one-dimensional value corresponding to any multi-dimensional point that may exist as a multi-dimensional data point and be contained within the succeeding subset of said multi-dimensional data identified in the previous step,
    (c) repeating the previous step zero or more times to identify further subsets of said multi-dimensional data that intersect with said query region,
  whereby said database and its index adapt efficiently to insertion and deletion of said multi-dimensional data, and
  whereby subsets of multi-dimensional data that intersect with a query region can be identified efficiently for searching and retrieval of multi-dimensional data that lies within the query region.

2. A method according to claim 1, wherein subsets of said multi-dimensional data that intersect with any specified query region which are identified are retrieved from said computer memory and searched for multi-dimensional data points that exist in said database, which are then outputted.

3. A method of storing and querying multi-dimensional data comprising the steps of,
  1 transforming multi-dimensional data points into one-dimensional values, using a bijective mapping between multi-dimensional points and one-dimensional values determined by the sequence in which an approximation of a Hilbert space-filling curve passes through the multi-dimensional points in the domain of a multi-dimensional database, which are stored in a one-dimensional index structure, comprising the steps of,
    (a) splitting data into a plurality of subsets, each corresponding to a length of the Hubert space-filling curve,
    (b) computing an identifier for each subset selected from the group consisting of the one-dimensional distance value of the start of a section of Hilbert space-filling curve corresponding to the subset of data from the beginning of the Hilbert space-filling curve and the one-dimensional distance value of the end of a section of Hilbert space-filling curve corresponding to the subset of data from the beginning of the Hubert space-filling curve and a pair of distance values on the section of Hilbert space-filling curve corresponding to the subset of data, wherein one is the lowest and the other is the highest one-dimensional value corresponding to actual data points stored in the database and lying on the section of Hilbert space-filling curve,
    (c) storing each said subset in said index using the subset identifier as an index key,
  2 using the index in calculating which subsets of said multi-dimensional intersect with the query utilizing bit-wise manipulation of said one-dimensional values,
  3 using the index to retrieve candidate subsets of data,
  4 searching candidate subsets of data and outputting data points which lie within the query region.

4. A method of storing multi-dimensional data on computer memory or computer storage media and retrieving subsets of said multi-dimensional data according to the specification of a query, comprising the steps of, 1. transforming multi-dimensional data points into one-dimensional values, using a bijective mapping between multi-dimensional points and one-dimensional values determined by the sequence in which an approximation of a Hilbert space-filling curve passes through the multi-dimensional points in the domain of a multi-dimensional database,
2. splitting data into a plurality of subsets, each corresponding to a length of the Hilbert space-filling curve,
3. computing an identifier for each said subset selected from the group consisting of the one-dimensional distance value of the start of a section of Hilbert space-filling curve corresponding to the subset of data from the beginning of the Hilbert space-filling curve and the one-dimensional distance value of the end of a section of Hilbert space-filling curve corresponding to the subset of data from the beginning of the Hilbert space-filling curve
and a pair of distance values on the section of Hilbert space-filling curve corresponding to the subset of data wherein one of said pair of distance values is the lowest and the other is the highest one-dimensional value corresponding to actual data points stored in the database and lying on the section of Hilbert space-filling curve,
4. storing each said subset on a page in said computer memory or computer storage media,
5. storing a reference to the location of each said subset in said computer memory or computer storage media in an index using the subset identifier as an index key,
6. determining at least one of the pages that intersect with a query by using identifiers in said index to calculate in numerical order, utilizing a process of bit-wise manipulation, one or more members of a set of one-dimensional distance values of points lying within the query region where each value, if it corresponds to a data point, lies on a different page, wherein the first value calculated is the distance value of a point within the query region that is closest to one end of the Hilbert space-filling curve and subsequently calculated values differ minimally from the previously calculated value,
7. using the index to locate and retrieve pages identified in the previous step,
8. searching retrieved pages and outputting data points which lie within the query region.

* * * * *